United States Patent [19]
Torii et al.

[11] Patent Number: 5,325,433
[45] Date of Patent: Jun. 28, 1994

[54] ENCRYPTION COMMUNICATION SYSTEM

[75] Inventors: Naoya Torii; Takayuki Hasebe; Ryota Akiyama, all of Kawasaki, Japan

[73] Assignee: Fujitsu Limited, Kawasaki, Japan

[21] Appl. No.: 41,453

[22] Filed: Apr. 2, 1993

[30] Foreign Application Priority Data

Apr. 2, 1992 [JP] Japan ............................. 4-080979

[51] Int. Cl.$^5$ .......................... H04L 9/30; H04L 9/08; H04L 9/00
[52] U.S. Cl. .......................................... 380/30; 380/9; 380/21; 380/43; 380/44; 380/49; 380/50
[58] Field of Search ........................ 380/21, 23, 25, 30, 380/43, 49, 9, 44, 50

[56] References Cited

U.S. PATENT DOCUMENTS

| | | | |
|---|---|---|---|
| 4,799,258 | 1/1989 | Davies | 380/21 |
| 4,944,007 | 7/1990 | Austin | 380/21 |
| 5,150,411 | 9/1992 | Maurer | 380/30 |

OTHER PUBLICATIONS

Rivest et al., "A Method for Obtaining Digital Signatures and Public-Key Cryptosystems," *ACM Communication*, vol. 21, 1978, pp. 120–126.
Akiyama et al., "ID-Based Key Management System using Discrete Exponentiation Calculation," 1990 *International Symposium on Information Theory and its Applications* (Isita '90), Hawaii, USA, Nov. 27–30, 1990, pp. 991–994.)

*Primary Examiner*—Bernarr E. Gregory
*Attorney, Agent, or Firm*—Staas & Halsey

[57] ABSTRACT

An encryption communication system including: a communication center having at least a key information generating unit for generating key generating information used for encryption communication; and a plurality of user computers, each interconnected by a plurality of paths through the communication center, and each having at least an encryption key generating unit and an encryption processing unit. The communication center generates the key generating information Z based on predetermined modulo arithmetic formula. The user computer sends a password PW to the communication center, receives the key generating information therefrom, and generates an encryption key K used between the user computer and another party's computer based on predetermined modulo arithmetic formula. Further, the communication center provides a plurality of modulus numbers to share prime numbers assigned to at least two paths between the user computer and the other party's computer, and between the user computer and another party's computer, so that is possible to reduce the number of prime numbers.

16 Claims, 23 Drawing Sheets

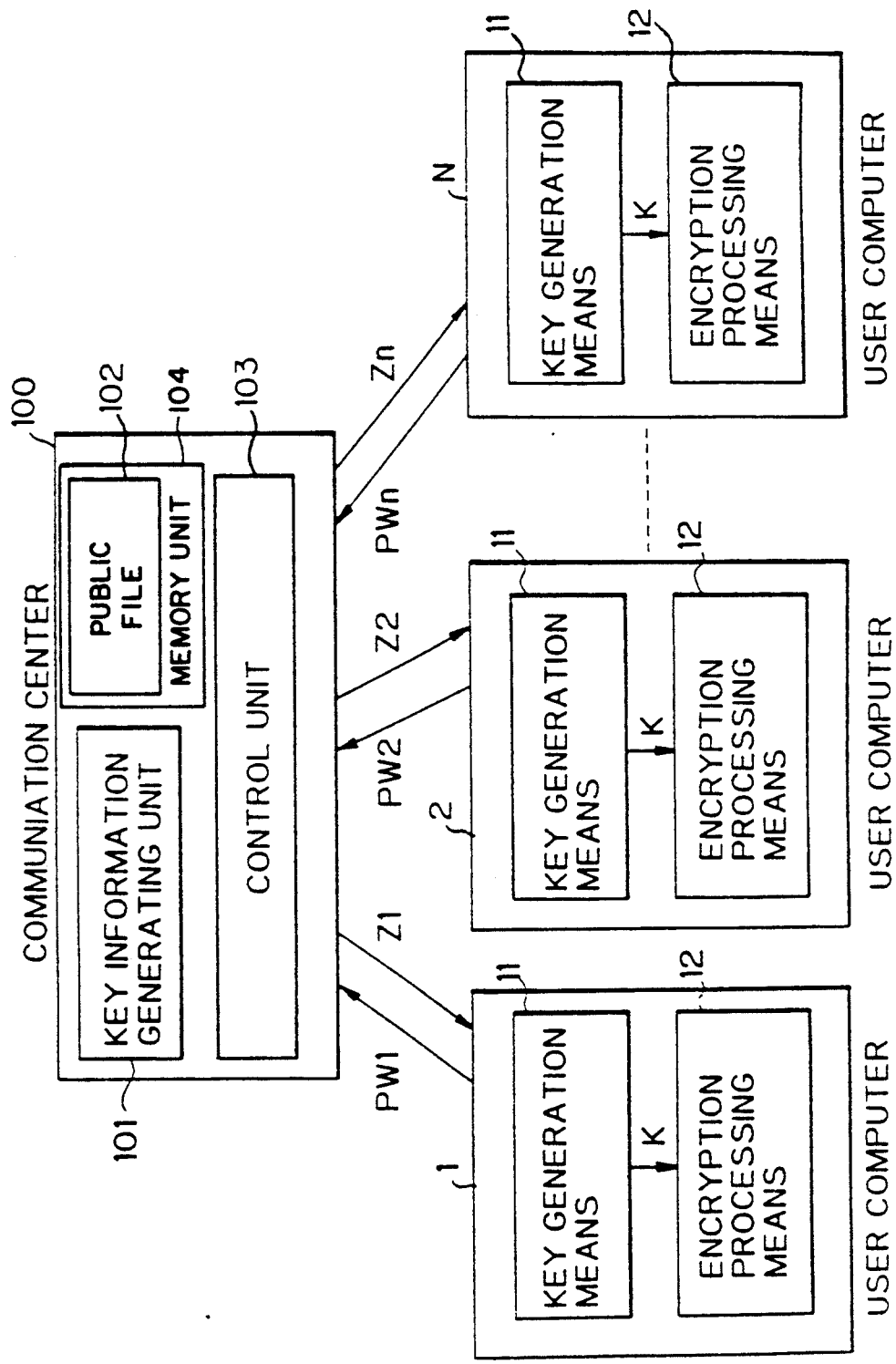

|   | A | B | C | D | E |
|---|---|---|---|---|---|
| A | ◎ | p1a | p1b | p4b | p5a |
| B | p1a | ◎ | p2a | p2b | p5b |
| C | p1b | p2a | ◎ | p3a | p3b |
| D | p4b | p2b | p3a | ◎ | p4a |
| E | p5a | p5b | p3b | p4a | ◎ |

Fig. 9 C

| GROUP | 1 | | | | 2 | | | | 3 | | | |
|---|---|---|---|---|---|---|---|---|---|---|---|---|
| USER | 1 | 2 | 3 | 4 | 1 | 2 | 3 | 4 | 1 | 2 | 3 | 4 |
| 1 1 | ● | 2 | 3 | 4 | 1 | 2 | 3 | 4 | 1 | 2 | 3 | 4 |
| 2 | 2 | ● | 6 | 7 | 2 | 5 | 6 | 7 | 2 | 5 | 6 | 7 |
| 3 | 3 | 6 | ● | 9 | 3 | 6 | 8 | 9 | 3 | 6 | 8 | 9 |
| 4 | 4 | 7 | 9 | ● | 4 | 7 | 9 | A | 4 | 7 | 9 | A |
| 2 1 | 1 | 2 | 3 | 4 | ● | 2 | 3 | 4 | 1 | 2 | 3 | 4 |
| 2 | 2 | 5 | 6 | 7 | 2 | ● | 6 | 7 | 2 | 5 | 6 | 7 |
| 3 | 3 | 6 | 8 | 9 | 3 | 6 | ● | 9 | 3 | 6 | 8 | 9 |
| 4 | 4 | 7 | 9 | A | 4 | 7 | 9 | ● | 4 | 7 | 9 | A |
| 3 1 | 1 | 2 | 3 | 4 | 1 | 2 | 3 | 4 | ● | 2 | 3 | 4 |
| 2 | 2 | 5 | 6 | 7 | 2 | 5 | 6 | 7 | 2 | ● | 6 | 7 |
| 3 | 3 | 6 | 8 | 9 | 3 | 6 | 8 | 9 | 3 | 6 | ● | 9 |
| 4 | 4 | 7 | 9 | A | 4 | 7 | 9 | A | 4 | 7 | 9 | ● |

Fig. 9 D

| | 1 | 2 | 3 |
|---|---|---|---|
| 1 | n1 | n12/n21 | n13/n31 |
| 2 | n12/n21 | n2 | n23/n32 |
| 3 | n13/n31 | n23/n32 | n3 |

Fig. 12 C

| GROUP | | 1 | | | | 2 | | | | 3 | | | |
|---|---|---|---|---|---|---|---|---|---|---|---|---|---|
| | USER | 1 | 2 | 3 | 4 | 1 | 2 | 3 | 4 | 1 | 2 | 3 | 4 |
| 1 | 1 | ◎ | 2 | 3 | 4 | 1 | 2 | 3 | 4 | 1 | 2 | 3 | 4 |
| | 2 | 2 | ◎ | 7 | 8 | 5 | 6 | 7 | 8 | 5 | 6 | 7 | 8 |
| | 3 | 3 | 7 | ◎ | C | 9 | A | B | C | 9 | A | B | C |
| | 4 | 4 | 8 | C | ◎ | D | E | F | G | D | E | F | G |
| 2 | 1 | 1 | 5 | 9 | D | ◎ | 2 | 3 | 4 | 1 | 2 | 3 | 4 |
| | 2 | 2 | 6 | A | E | 2 | ◎ | 7 | 8 | 5 | 6 | 7 | 8 |
| | 3 | 3 | 7 | B | F | 3 | 7 | ◎ | C | 9 | A | B | C |
| | 4 | 4 | 8 | C | G | 4 | 8 | C | ◎ | D | E | F | G |
| 3 | 1 | 1 | 5 | 9 | D | 1 | 5 | 9 | D | ◎ | 2 | 3 | 4 |
| | 2 | 2 | 6 | A | E | 2 | 6 | A | E | 2 | ◎ | 7 | 8 |
| | 3 | 3 | 7 | B | F | 3 | 7 | B | F | 3 | 7 | ◎ | C |
| | 4 | 4 | 8 | C | G | 4 | 8 | C | G | 4 | 8 | C | ◎ |

Fig. 12 D

| | 1 | 2 | 3 |
|---|---|---|---|
| 1 | n1 | n12 | n13 |
| 2 | n12 | n2 | n23 |
| 3 | n13 | n23 | n3 |

Fig. 15 C

| GROUP | | 1 | | | | 2 | | | | 3 | | | |
|---|---|---|---|---|---|---|---|---|---|---|---|---|---|
| | USER | 1 | 2 | 3 | 4 | 1 | 2 | 3 | 4 | 1 | 2 | 3 | 4 |
| 1 | 1 | ● | 2 | 3 | 4 | 1 | 2 | 3 | 4 | 1 | 2 | 3 | 4 |
| | 2 | 2 | ● | 6 | 7 | 2 | 5 | 6 | 7 | 2 | 5 | 6 | 7 |
| | 3 | 3 | 6 | ● | 9 | 3 | 6 | 8 | 9 | 3 | 6 | 8 | 9 |
| | 4 | 4 | 7 | 9 | ● | 4 | 7 | 9 | A | 4 | 7 | 9 | A |
| 2 | 1 | 1 | 2 | 3 | 4 | ● | 2 | 3 | 4 | 1 | 2 | 3 | 4 |
| | 2 | 2 | 5 | 6 | 7 | 2 | ● | 6 | 7 | 2 | 5 | 6 | 7 |
| | 3 | 3 | 6 | 8 | 9 | 3 | 6 | ● | 9 | 3 | 6 | 8 | 9 |
| | 4 | 4 | 7 | 9 | A | 4 | 7 | 9 | ● | 4 | 7 | 9 | A |
| 3 | 1 | 1 | 2 | 3 | 4 | 1 | 2 | 3 | 4 | ● | 2 | 3 | 4 |
| | 2 | 2 | 5 | 6 | 7 | 2 | 5 | 6 | 7 | 2 | ● | 6 | 7 |
| | 3 | 3 | 6 | 8 | 9 | 3 | 6 | 8 | 9 | 3 | 6 | ● | 9 |
| | 4 | 4 | 7 | 9 | A | 4 | 7 | 9 | A | 4 | 7 | 9 | ● |

Fig. 15 D

| | 1 | 2 | 3 |
|---|---|---|---|
| 1 | n1 | n12 | n13 |
| 2 | n12 | n2 | n23 |
| 3 | n13 | n23 | n3 |

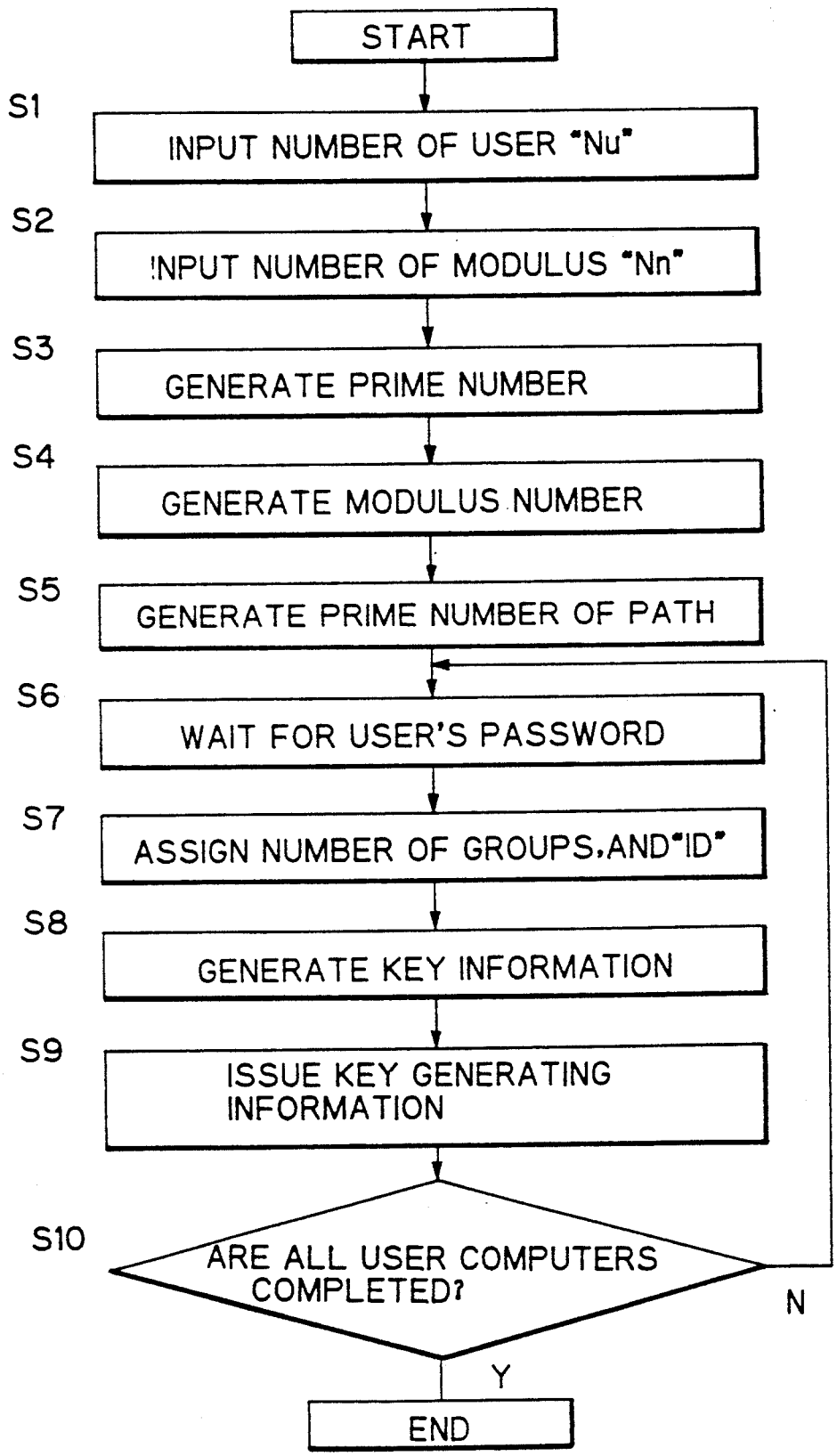

ENCRYPTION COMMUNICATION SYSTEM

BACKGROUND OF THE INVENTION

1. Field of the Invention

The present invention relates to an encryption communication system between computers, and more particularly, it relates to a method for encryption communication between user computers by using a shared encryption key therebetween.

2. Description of the Related Art

Recently, encryption communication using a shared encryption key is widely utilized in computer networks.

In such a network, each computer user previously registers his own password in a communication center of the network. The communication center issues an identification number and a key generating information to the user. Then, the user's computer generates a shared encryption key based on the identification number and the key generating information, and performs the encryption communication between the user's computer and another party's computer.

In encryption communication, various technical terms and modulo arithmetic are used in the calculation of a shared encryption key, e.g., "prime number(s)", "prime number for path", "product of prime numbers", "modulus number(s)" "password" "center identifying information", "key generating information" and "exponential calculation".

In the communication center, however, the above processes requires very complex and troublesome calculation, particularly, calculation of prime numbers for paths between user computers so that a large amount of time is required for generation of the shared encryption key between user computers as explained in detail below.

SUMMARY OF THE INVENTION

The object of the present invention is to provide an encryption communication system enabling reduction of prime numbers for paths between user computers so that calculation time for generating an encryption key is considerably reduced.

In accordance with the present invention, there is provided an encryption communication system including:

a communication center having at least a key information generating unit for generating key generating information used for encryption communication; and a plurality of user computers interconnected by a plurality of paths through the communication center, and each having at least an encrypting key generating unit and an encryption processing unit;

wherein, the communication center generates the key generating information Z based on the following modulo arithmetic formulae, $$Z = M ** (1/(PW * (\text{product of prime numbers})) ) \bmod n$$

The user computer sends a password PW to the communication center, receives the key generating information therefrom, and generates an encryption key K to be used between the user computer and another party's computer based on the following modulo arithmetic formula, $$K = Z ** (PW * (\text{product of prime numbers except for the prime number for the other party's computer})) \bmod n$$

The communication center provides a plurality of modulus numbers to share prime numbers assigned to at least two paths between the user computer and the other party's computer, and between the user computer and another party's computer, so that it is possible to reduce the number of prime numbers.

In the formula, M is a center identifying information for the communication center, PW is a password generated by the user computer, "*" is multiplication, "**" is exponential calculation, and "mod n" is modulus number of the modulo arithmetic (modulo n arithametic).

In one preferred embodiment, the communication center provides a plurality of center identifying information to share the prime numbers assigned to at least two paths between the user computer and the other party's computer, and between the user computer and another party's computer, so that it is possible to reduce the number of prime numbers.

In another preferred embodiment, the communication center provides a plurality of modulus numbers and a plurality of center identifying information to share the prime numbers assigned to at least two paths between the user computer and the other party's computer, and between the user computer and another party's computer, so that it is possible to reduce the number of prime numbers.

In still another preferred embodiment, the communication center divides a plurality of user computers into a plurality groups, assigns the same prime numbers for the paths to the user computers in each group, assigns one modulus number for the key generating information within one group, and assigns two modulus numbers for the key generating information between groups, so that it is possible to reduce the number of prime numbers.

In still another preferred embodiment, the communication center divides a plurality of user computers into a plurality groups, assigns the same prime numbers for the paths to the user computers in each group, assigns one piece of center identifying information for the key generating information within one group, and assigns two pieces of center identifying information for the key generating information between groups, so that it is possible to reduce the number of prime numbers.

In still another preferred embodiment, the communication center divides a plurality of user computers into a plurality of groups, assigns the same two prime numbers for the path having a direction to the user computers in each group, and assigns one modulus number for the key generating information within one group and between groups, so that it is possible to reduce the number of prime numbers.

In still another preferred embodiment, the communication center divides a plurality of user computers into a plurality of groups, assigns the same two prime numbers for the paths having the direction to the user computers in each group, assigns one piece of center identifying information for the key generating information within one group and between groups, so that it is possible to reduce the number of prime numbers.

In still another preferred embodiment, the communication center divides a plurality of user computers into a plurality of groups, assigns the same prime numbers for the paths to the user computers in each group, assigns one modulus number for the key generating information within one group and between groups, and assigns a plurality of center identifying information for the key generating information within one group and between groups, so that it is possible to reduce the number of prime numbers.

In still another preferred embodiment, a plurality of modulus numbers are given by two modulus numbers, i.e., "mod na" and "mod nb" where, "a" and "b" denote two different paths between user computers.

In still another preferred embodiment, a plurality of center identifying information is given by two pieces of information, i.e., "M1" and "M2" where M1 is one pieces of center identifying information, and M2 is another piece of center identifying information.

In still another preferred embodiment, the key information generating means comprises a prime number generation unit for generating prime numbers based on the number of the modulus numbers, a calculation unit for calculating two of the modulo arithmetic formulae for the key generating information and the encryption key, and a secret file for storing generated prime numbers.

In still another preferred embodiment, the encryption communication system further comprises a public file for storing the modulus numbers and the prime numbers of the paths, and a control unit for controlling transmission of the key generating information to the user computer and reception of the password therefrom.

In still another preferred embodiment, "n" of the modulus number is determined by calculation of a product of two large prime numbers, preferably, each 256 bits.

BRIEF DESCRIPTION OF THE DRAWINGS

In the drawings:

FIG. 2 is a basic structure of an encrypting communication system according to the present invention;

DESCRIPTION OF THE PREFERRED EMBODIMENTS

Before describing the preferred embodiments, a conventional art and its problems will be explained in detail below.

Figures 1A, 1B:
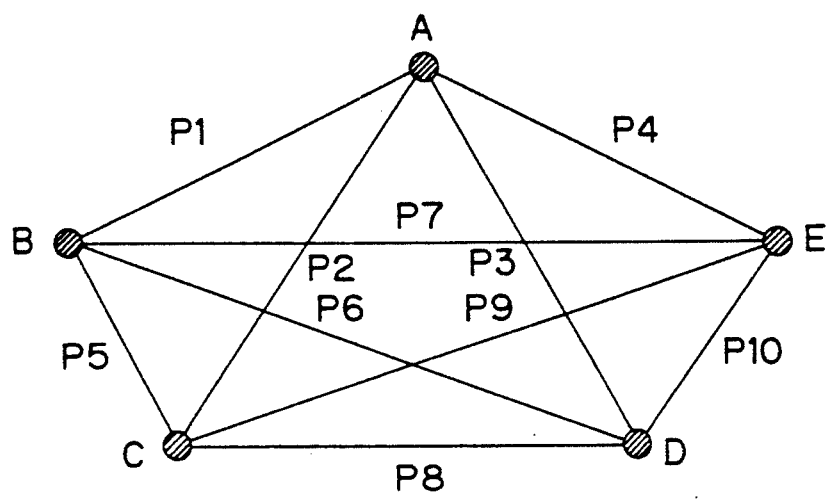
FIG. 1A shows a computer network for performing encryption communication in a conventional art.
FIG. 1B shows a table for assigning prime numbers for paths in a conventional art.

FIG. 1A shows a computer network for performing encryption communication in a conventional art, and FIG. 1B shows a table for assigning prime numbers in a conventional art. In the drawings, A to E denote user computers, and P1 to P10 denote prime numbers assigned to each path. That is, for example, P1 denotes the prime number assigned to the path A-B, P2 denotes the prime number assigned to the path A-C, and P4 denotes the prime number assigned to the path A-E as shown in FIG. 1B.

In this example, the number of user computers is five (A to E). First, each computer user registers his own password PW in the communication center. The communication center assigns a prime number Pi (i=1, 2 ---, 10) to each path, and generates a key generation information Z to each user computer. The key generation information Z is given by the following formula. In this case, for example, ZA denotes the key generation information sent to the user computer A, and PWA denotes the password of the user computer A.

to user computer A:

$$ZA = M ** (1/(PWA * p1 * p2 * p3 * p4)) \bmod n$$

to user computer B:

$$ZB = M ** (1/(PWB * p1 * p5 * p6 * p7)) \bmod n$$

to user computer C:

$$ZC = M ** (1/(PWC * p5 * p2 * p9 * p8)) \bmod n$$

to user computer D:

$$ZD = M ** (1/(PWD * p8 * p6 * p3 * p10)) \bmod n$$

to user computer E:

$$ZE = M ** (1/(PWE * p3 * p4 * p9 * p10)) \bmod n$$

Where, "M" denotes a center identifying information which indicates the number of the communication center, "**" denotes exponential calculation (i.e., power calculation), "*" denotes multiplication, and "mod n" denotes a modulus number "n" of modulo "n" arithmetic. In this case, the modulus number "n" is a kind of "divisor". For example, the calculation "X" mod y=1" can be explained as the remainder is "1" when "X" is divided by "y".

That is, in the above formula, 1/(PWA * p1 * p2 * p3 * p4) indicates an inverse number of (PWA * p1 * p2, p3 * p4), "M ** ( )" indicates M( ), and "p1 * p2" indicates "multiply p1 by p2".

In this case, "n" is given by a product of two large prime numbers "p" and "q". In this case, the prime numbers "p" and "q" are not published (kept secret), and a modulus number "n" is published. However, the communication center can calculate the inverse number of the password PWi and the path "pi" because only the center knows a prime factor of the modulus number "n".

As shown in FIGS. 1A and 1B, the prime numbers informed by the communication center to each user computer are as follows. The prime number is held in the user computer.

to user computer A: (p1, p2, p3, p4)
to user computer B: (p1, p5, p6, p7)
to user computer C: (p5, p2, p9, p8)
to user computer D: (p8, p6, p3, p10)
to user computer E: (p3, p4, p9, p10)

Further, as is obvious from the above, the prime numbers generated and held by the communication center are as follows.

center: (p1, p2, p3, p4, p5, p6, p7, p8, p9, p10)

Accordingly, the information published by the center are the modulus number "n", prime numbers, and passwords.

For example, when performing the encryption communication between the user computers A and B, the user computer A erases the inverse numbers except for the prime number "p1" assigned to the path A-B, and obtains a shared encryption key KAB as follows.

$$KAB = ZA ** (PWA *p2 * p3 * p4) \bmod n$$
$$(= M ** (1/p1) \bmod n)$$

Similarly, the user computer B erases the inverse numbers except for the prime number "p1" assigned to the path A-B, and obtains the shared encryption key KAB as follows.

$$KAB = ZB ** (PWB * p5 * p6 * p7) \bmod n$$
$$(= M ** (1/p1) \bmod n)$$

Accordingly, the shared encryption key KAB is used between the user computers A and B, and a plain text (i.e., unencrypted) sentence to be communicated is encrypted by using the shared encryption key in each user computer. Then, one user computer sends the encrypted sentence to the other party's computer, and the other party's computer decrypts the encrypted sentence to obtain the original sentence.

As explained above, in the conventional art, the communication center must generate many prime numbers in accordance with the following formula to assign the prime numbers to all paths.

(Nu−1) Nu/2

Where, Nu is the number of user computers connected to the network. For example, in FIG. 1A, since Nu is "5", the above formula becomes (5−1) 5/2 = 10. That is, the number of the prime number is "10".

As is obvious above formula, the more the number of user computers Nu, the greater the number of the prime numbers. Accordingly, the above conventional processes requires very complex and troublesome calculations for the prime numbers so that a large amount of time is required for generation of the shared encryption key between user computers.

In the present invention, the prime numbers assigned to the paths are reduced by employing a plurality of modulus numbers "n" and a plurality of center identifying information "M", and further by dividing modulus numbers "n" into some groups.

FIG. 2 is a basic structure of an encrypting communication system according to the present invention. In FIG. 2, the communication center 100 includes a key information generating unit 101, a public file 102, in a memory unit 104 and a control unit 103. Further, each of user computers 1 to N includes a key generation means 11 and an encryption processing means 12.

The key information generating unit 101 generates the key generation information Z1, Z2, ---, Zn, the modulus number(s) "n", and the prime numbers for the path "p".

The public file 102 stores information to be published from the information in the communication center 100, for example, the modulus number "n" and the prime number "p" for the path.

The control unit 103 controls transmission and reception of information between user computers.

For example, the user computer 1 receives the key generation information Z1, modulus numbers "n", and prime numbers "p" for the paths to generate the encryption key, and performs the encryption communication between user computers.

The key generation means 11 in the user computer generates the encryption key K in accordance with the key generation information Z1, modulus numbers "n", and prime numbers "p" for the paths received from the communication center 100.

The encryption processing means 12 encrypts the plain text (i.e., unencrypted) sentence based on the encryption key K generated by the key generation means 11. The encrypted sentence is transmitted to another party's computer. The other party's computer decrypts the encrypted sentence, and obtains the original plain text sentence.

To explain in more detail, the key information generation unit 101 generates the key generation information Z based on the following formula, and transmits it to the user computer.

$$Z = M ** (1/(PW * (\text{product of prime numbers "p"})) \bmod n$$

When the key generation means 11 receives the key generation information Z, it generates the encryption key K based on the following formula.

$$K = Z ** (PW * \text{(prime number except for partner)}) \bmod n$$

Figure 3:
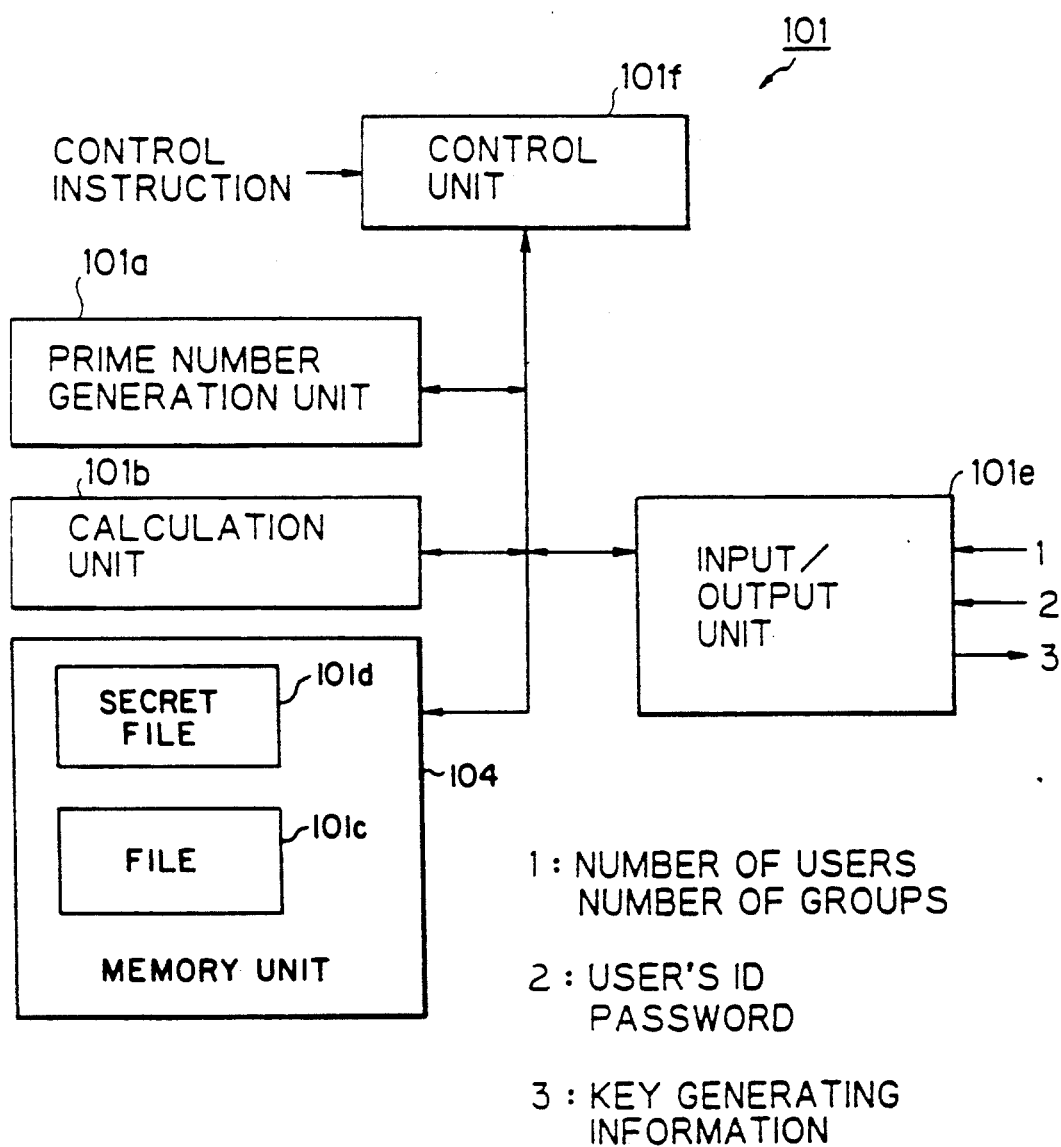
FIG. 3 is a detailed block diagram of a key information generation unit shown in FIG. 2.
Figure 18:
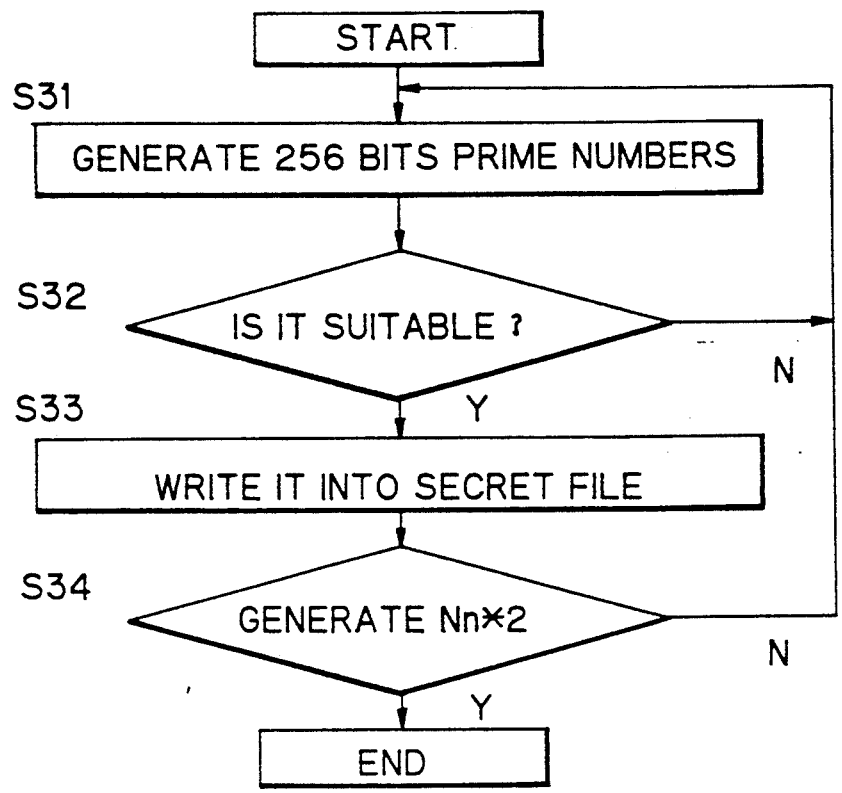
FIGS. 18A to 18D are flowcharts for the key information generating means shown in FIG. 3.
Figure 18:
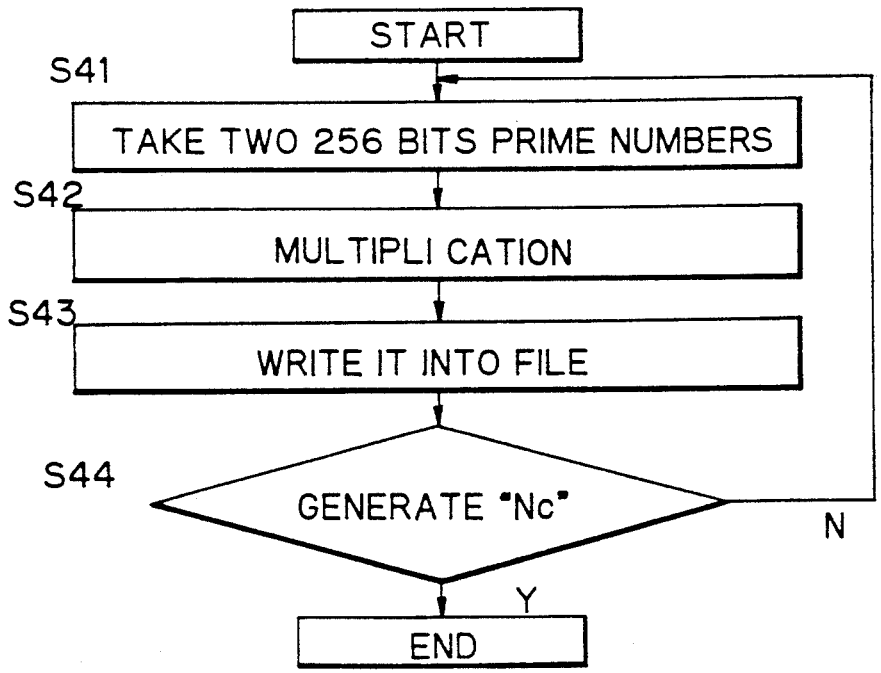

FIG. 3 is a detailed block diagram of a key information generation unit 101 shown in FIG. 2. The operation of this unit is explained in detail in FIGS. 18A to 18D. In FIG. 3, a prime number generation unit 101a generates the prime number for the path connected between user computers. The detailed steps are shown in FIG. 18B. A calculation unit 101b performs various calculation as shown in FIG. 18C. A file 101C in a memory unit 104 stores various information. A secret file 101d in a memory unit 104 stores secret information (for example, large prime numbers "p" and "q" (each 256 bits)). An input/output unit 101e receives various information, for example, the number of user computers, the number of groups, user computer ID, and password. The input/output unit 101e outputs the key generation information. A control unit 101f receives a control instruction, and controls the operation of all components 101a to 101e.

Figure 4:
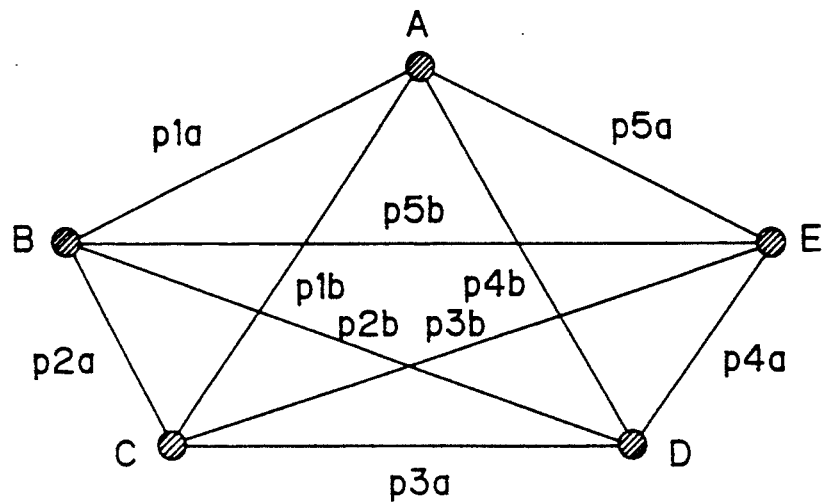
FIG. 4A is a computer network for performing encryption communication according to one embodiment of the present invention.
FIG. 4B shows a table for assigning prime numbers for paths according to the present invention.

FIG. 4A is a computer network for performing encryption communication according to one embodiment of the present invention, and FIG. 4B shows a table for assigning prime numbers according to the present invention. In this case, the modulus number "n" is given by "2", i.e., the modulus numbers are "na" and "nb". Further, the same prime number is assigned to two paths. That is, for example, the path A-B has the prime number "p1", and the path A-C also has the same prime number "p1". Accordingly, it is possible to reduce the prime number to half of the conventional number of prime numbers.

In FIG. 4A, A to E denote user computer IDs (passwords), and p1a to p5b denote prime numbers assigned to each path. The key generation information Z and the prime numbers are expressed as follows. As is obvious, two pieces of key generation information are given to one user computer.

to user computer A:

$$ZA1 = M ** (1/PWA * p1 * p5) \bmod na \quad (1)$$

$$ZA2 = M ** (1/PWA * p1 * p4) \bmod nb \quad (2)$$

to user computer B:

$$ZB1 = M ** (1/PWB * p1 * p2) \bmod na$$

$$ZB2 = M ** (1/PWB * p2 * p5) \bmod nb$$

to user computer C:

$$ZC1 = M ** (1/PWC * p2 * p3) \bmod na$$

$$ZC2 = M ** (1/PWC * p1 * p3) \bmod nb$$

to user computer D:

$$ZD1 = M ** (1/PWD * p2 * p4) \bmod na$$

$$ZD2 = M ** (1/PWD * p3 * p4) \bmod nb$$

to user computer E:

$$ZE1 = M ** (1/PWE * p4 * p5) \bmod na$$

$$ZE2 = M ** (1/PWE * p3 * p5) \bmod nb$$

The published prime numbers which are held in the user computer are as follows.
user computer A: (p1, p4, p5)
user computer B: (p1, p2, p5)
user computer C: (p1, p2, p3)
user computer D: (p2, p3, p4)
user computer E: (p3, p4, p5)

Further, the prime numbers held in the center are as follows.
(p1, p2, p3, p4, p5)

As explained above, the number of the prime numbers to be generated in the center can be reduced in number to half. Two kinds of the modulus numbers "na" and "nb" are provided for preventing unauthorized generation of the encryption key (i.e., not assigned to the user computer). Further, amount of the key generation information and number of the modulus number "n" to be held by the user computer become double. The encryption key is generated by the user by exponentially multiplying the key generation information Z by the prime number and the password as explained in detail below.

Figure 5:
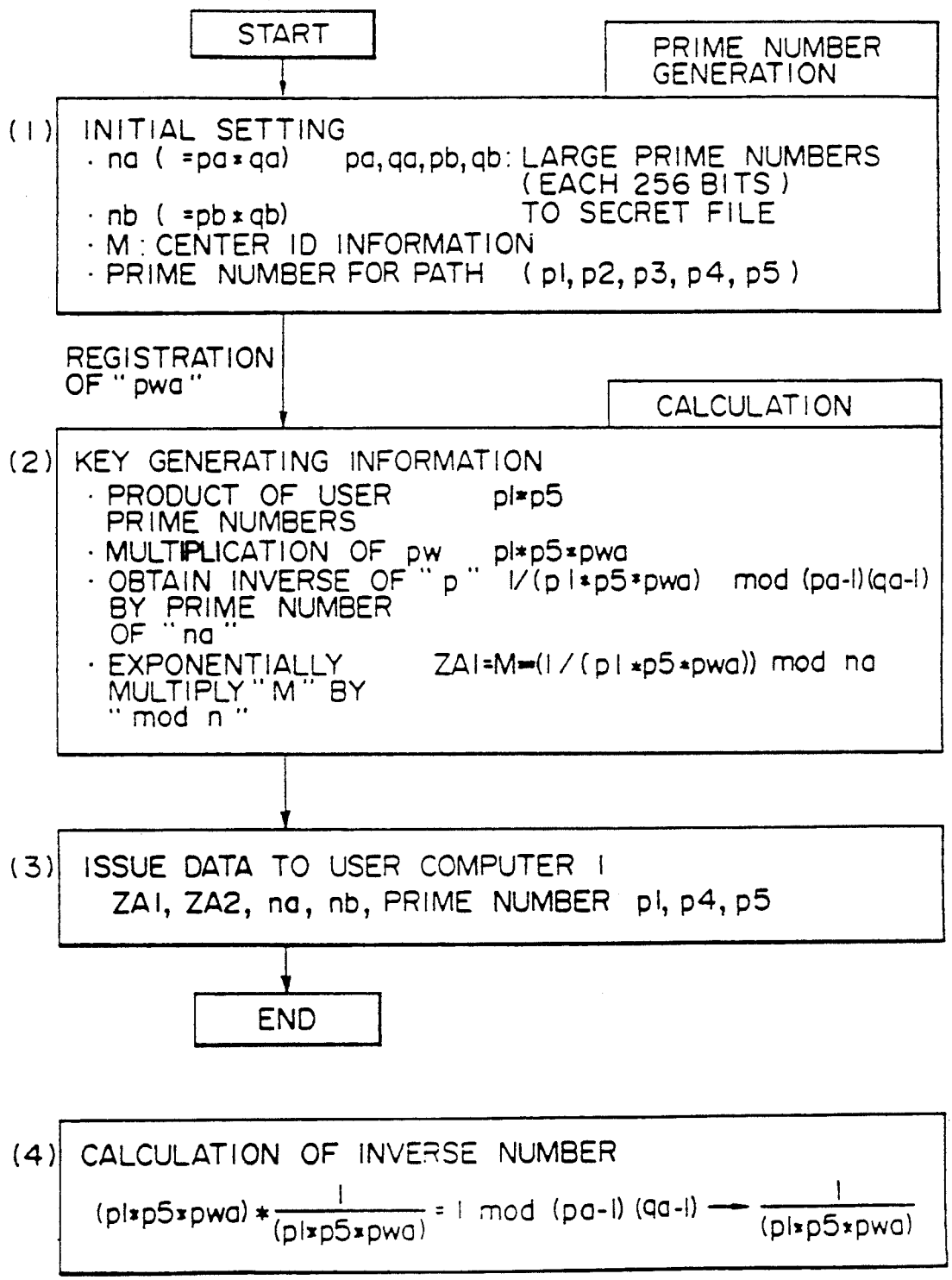
FIG. 5 is a control flowchart in the communication center shown in FIGS. 4A and 4B.

FIG. 5 is a control flowchart in communication center shown in FIG. 4A. This is in the case of two modulus numbers "na" and "nb".

(1) The center performs an initial setting. That is, the prime number generating means 101a of the key information generating unit 101 sets the following values.
na (=pa * qa), where, pa, pb, qa and qb are large prime numbers (each having 256 bits)
nb (=pb * qb), this is sent to the secret file
M (center identifying (ID) information)
prime numbers for path (p1, p2, p3, p4 and p5)

Where, the modulus number "na" is given by the product (i.e., pa * qa) of the large prime numbers "pa" and "qa", and the modulus number "nb" is given by the product (i.e., pb * qb) of the large prime numbers "pb" and "qb". These large prime numbers "pa" "qa" "pb" and "qb" are held in the secret file 101d and are not published. "M" is the center identifying information (number). The prime numbers for the path are given by p1, p2, p3, p4, and p5.

(2) In the initial setting state as defined above, when the password "pwa" from the user computer A is registered in the center, the key information generating unit 101 generates the key generating information.
product of prime numbers: p1 * p5 (see, key generation information of the formula (1))
multiplication of "pw": p1 * p5 * pwa
obtain inverse number by prime factor of "na" as follows.
1/(p1 * p5 * pwa ) mod (pa−1) (qa−1)
exponential multiplication of "M" by "mod n"
(to obtain key generating information ZA1 of formula (1))
(similarly, to obtain ZB2 of formula (2))

As explained above, the key information generating unit 101 generates two kinds of key generation information ZA1 and ZA2 in accordance with the password "pwa" transmitted from the user computer A.

(3) The key information generating unit 101 issues the following information to the user computer A.
ZA1 and ZA2
na and nb
prime numbers (p1, p4, and p5)

(4) This shows how to obtain an inverse number in step (3). That is, the inverse number 1/(p1 * p5 * pwa) of the number (p1 * p5 * pwa) is obtained so as to satisfy the following formula, i.e., $$(p1 * p5 * pwa) * 1/(p1 * p5 * pwa) = 1 \bmod (pa - 1)(pb - 1)$$

As explained above, the communication center sends the information (ZA1, ZA2, na, nb, prime numbers (p1, p4, p5)), which is required to generate the encryption key in the user computer A, in response to the password "pwa" from the user computer A.

Figure 6:
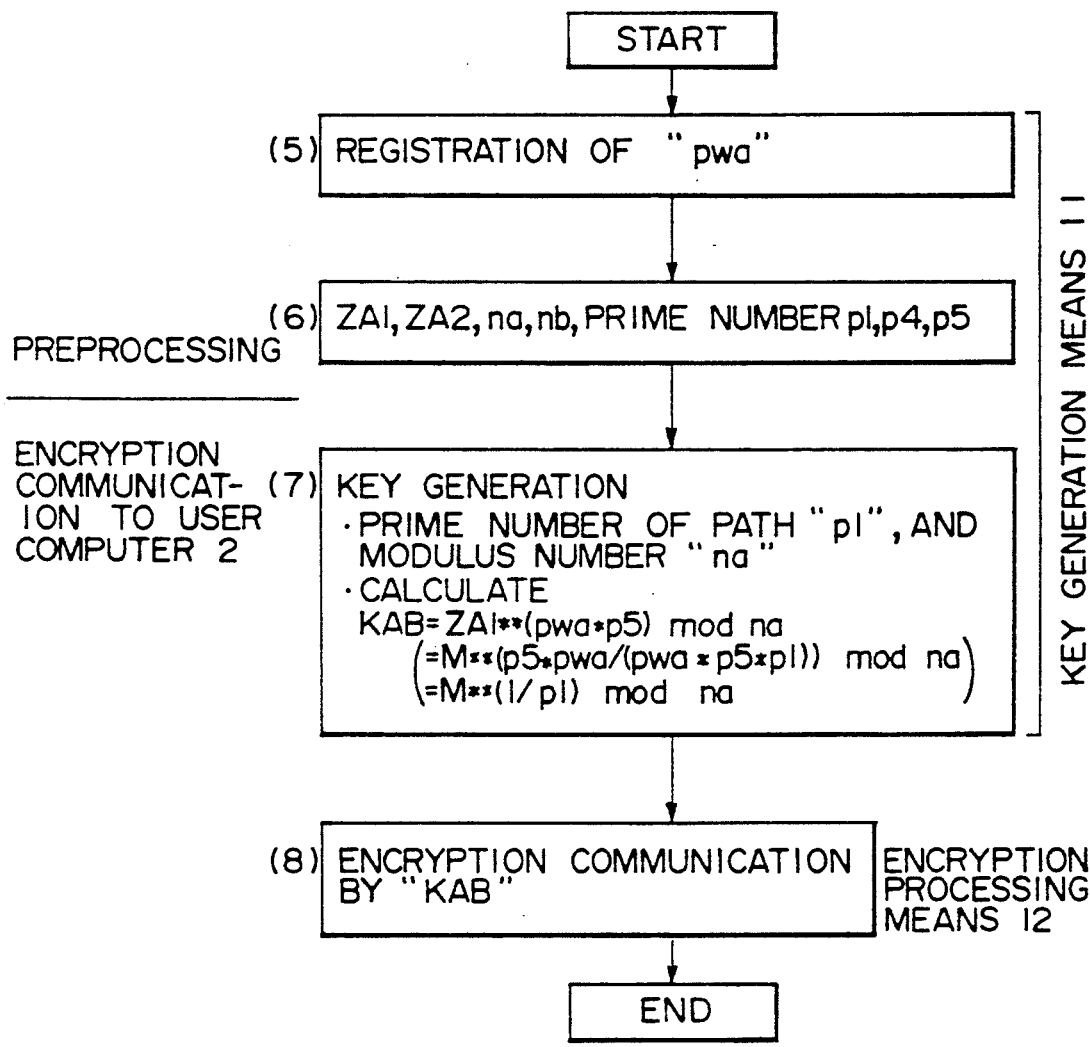
FIG. 6 is a control flowchart in a user computer in FIG. 5.

FIG. 6 is a control flowchart in the user computer A in FIG. 5. This is in the case of two modulus numbers "na" and "nb". This flowchart corresponds to the encrypting communication between the user computers A and B in FIG. 4A.

(5) The user computer A registers the password "pwa" in the center. This corresponds to the steps from (1) to (2) in FIG. 5.

(6) After registration of the password "pwa", the user computer A receives the information (ZA1, ZA2, ns, nb, prime numbers (p1, p4, p5)) from the center.

(7) The user computer A generates the encryption key before the communication is started with the user computer B. In this process, it is clarified that the prime number is "p1" and the modulus number is "ns" since the user computer A tries to communicate with the user computer B as shown in FIG. 4B. Next, the user computer A calculates the following formula.

$$KAB = ZA1 ** (pwa * p5) \bmod na,$$
$$= M ** (1/P1) \bmod na$$

Accordingly, the encryption key KAB, which is required when performing the encryption communication between user computers A and B, is generated in the user computer A.

(8) The encrypting communication between the user computer A and B is started by using the encryption key KAB. That is, the user computer A encrypts the plain text sentence to be communicated based on the encryption key KAB, and transfers the encrypted sentence to the other party's computer B. The other party's computer B receives the encrypted sentence, and decrypts it to the original unencrypted sentence (i.e., plain text sentence) based on the encryption key KAB.

As explained above, the center employs two modulus numbers "ns" and "nb", generates two kinds of key generation information ZA1 and ZA2 for one user computer, and sends them to the user computer A. When the user computer A receives the key generation information ZA1 and ZA2, it generates the encryption key KAB, the modulus number "ns" and the prime number (pwa * p5) in accordance with the table shown in FIG. 4B. As is obvious from the table in FIG. 4B, since the user computer A employs two modulus numbers "na" and "nb", it is possible to reduce the number of the prime numbers "p" to half of the number of prime numbers in comparison with the state in which the modulus number "n" is only one. When once the processes (5) and (6) are established, the encryption key can be generated by steps (7) and (8) without any communication with the center.

Figure 7:
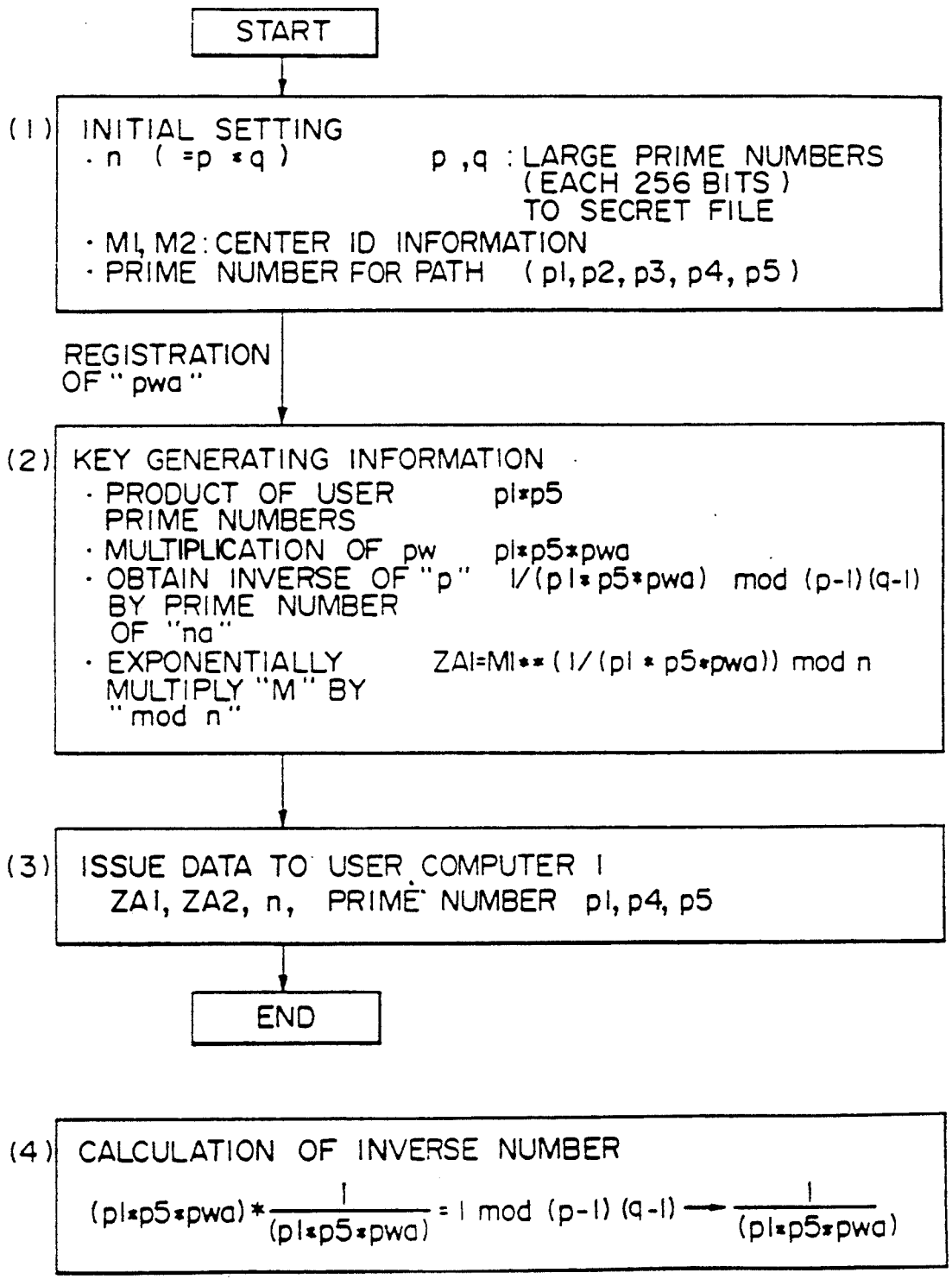
FIG. 7 is a control flowchart in a communication center as another embodiment of the present invention.

FIG. 7 is a control flowchart in a communication center as another embodiment of the present invention. This is a case of two pieces of center identifying information "M1" and "M2". Before explaining this drawing, a detailed explanation is given for FIGS. 4A and 4B.

In FIG. 4B, "p1a" to "p5b" are the prime numbers assigned to the paths. In this case, the prime number "pia" is equal to "pib" (where, i=1, 2, ---, 5), and "pia" is used for "M1" and "pib" is used for "M2".

The key generation information to be assigned to each user computer, and the prime numbers to be held are shown as follows.

to user computer A:

$$ZA1 = M1 ** (1/PWA * p1 * p5) \bmod n \quad (3)$$

$$ZA2 = M2 ** (1/PWA * p1 * p4) \bmod n \quad (4)$$

to user computer B:

$$ZB1 = M1 ** (1/PWB * p1 * p2) \bmod n$$

$$ZB2 = M2 ** (1/PWB * p2 * p5) \bmod n$$

to user computer C:

$$ZC1 = M1 ** (1/PWC * p2 * p3) \bmod n$$

$$ZC2 = M2 ** (1/PWC * p1 * p3) \bmod n$$

to user computer D:

$$ZD1 = M1 ** (1/PWD * p2 * p4) \bmod n$$

$$ZD2 = M2 ** (1/PWD * p3 * p4) \bmod n$$

to user computer E:

$$ZE1 = M1 ** (1/PWE * p4 * p5) \bmod n$$

$$ZE2 = M2 ** (1/PWE * p3 * p5) \bmod n$$

The published prime numbers held in the user computer are as follows.
user computer A: (p1, p4, p5)
user computer B: (p1, p2, p5)
user computer C: (p1, p2, p3)
user computer D: (p2, p3, p4)
user computer E: (p3, p4, p5)

Further, the prime numbers held in the center are as follows.
i.e., (p1, p2, p3, p4, p5)

Where M1 and M2 are two kinds of the center identifying information, by using two kinds of center identifying information, it is possible to reduce the number of prime numbers to half the number compared with only one kind of center identifying information. Further, it is possible to have double of the key generating information in the user computer.

In FIG. 7, this flowchart shows control processes in the communication center when transferring the key generation information to the user computer A.

(1) The center performs an initial setting. That is the prime number generation unit 101a of the key information generating unit 101 sets the following values.

n(=p * q), where, p and q are large prime numbers, and they are sent to the secret file.

M1 and M2 (center identifying information)
prime numbers for paths (p1, p2, p3, p4, p5)
Where, the modulus number "n" is given by the product "p * q" of the large prime numbers "p" and "q". These large prime numbers are held in the secret file 101d and are not published. "M1" and "M2" are both center identifying information. The prime numbers for paths are given by p1, p2, p3, p4, and p5.

(2) In the initial setting state as explained above, when the user computer A registers the password "pwa" in the center, the center generates the key generation information.

product of prime numbers: p1 * p5 (see, formula (3))
multiplication of "pw": p1 * p5 * pwa
obtain inverse number by the prime factor of "n". i.e.,
1/(p1 * p5 * pwa) mod (p−1) (q−1)
exponential multiplication "M" by "mod n"(obtain the key generating information ZA1 of formula (3))
(similarly, obtain ZB2 of formula (4))

As explained above, the key information generating unit 101 generates two kinds of key generating information ZA1 and ZA2 in accordance with the password "pwa" from the user computer A.

(3) The key information generating unit 101 issues the following information to the user computer A.
ZA1 and ZA2
n
prime numbers (p1, p4, p5)

(4) This shows how to obtain an inverse number in step (3). That is, the inverse number 1/(p1 * p5 * pwa) of the number (p1 * p5 * wpa) is obtained so as to satisfy the following formula.

$$(p1 * p5 * pwa) * 1/(p1 * p5 * pwa) = 1 \bmod (p - 1)(q - 1)$$

As explained above, the center sends the information (ZA1, ZA2, n, prime numbers (p1, p4, p5)), which are required to generate the encryption key in the user computer A, in response to the password "pwa" from the user computer A.

Figure 8:
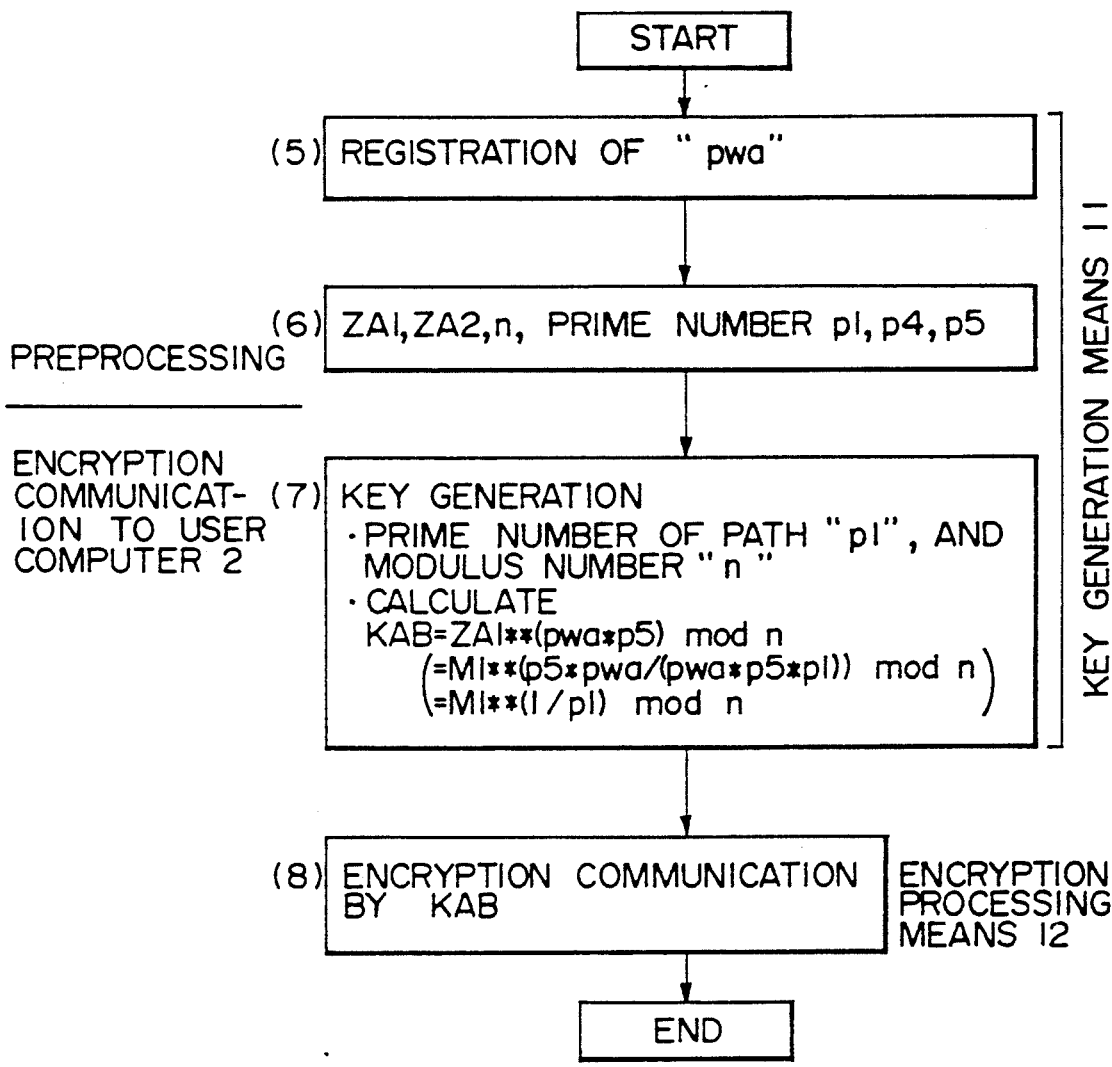
FIG. 8 is a control flowchart in a user computer shown in FIG 7.

FIG. 8 is a control flowchart in the user computer A in FIG. 7. This is in the case of two pieces if center identifying information M1 and M2. This flowchart corresponds to the encrypting communication between the user computers A and B in FIG. 4A.

(5) The user computer A registers the password "pwa" into the center. This corresponds to the step from (1) to (2) in FIG. 7.

(6) After registration of the password "pwa", the user computer A receives the information (ZA1, ZA2, n, prime numbers (p1, p4, p5)) from the center.

(7) The user computer A generates the encryption key before the communication is started with the other party's computer B. In this process, it is clarified that the prime number is "p1" and the modulus number is "n" since the user computer A tries to communicate with the user computer B as shown in FIG. 4B. Next, the user computer A calculates the following formula.

$$KAB = ZA1 ** (pwa * p5) \bmod n$$
$$= M ** (1/P1) \bmod n$$

Accordingly, the encryption key KAB is generated in the user computer A.

(8) The encryption communication between the user computer A and B is started by using the encryption key KAB.

As explained above, the center employs two pieces of center identifying information M1 and M2, generates the key generation information ZA1 and ZA2, and sends them to the user computer A. The user computer A generates the encryption key KAB by using the ZA1, the modulus number "n" and the prime number (pwa * p5) in accordance with the table shown in FIG. 4B. As is obvious from the table in FIG. 4B, since the user computer A employs two pieces of center identifying information, it is possible to reduce the number of prime numbers to half the number of prime numbers compared with the conventional art. When once the processes (5) to (6) are established, the encryption key can be generated by steps (7) and (8) without communication with the center.

Figure 9:
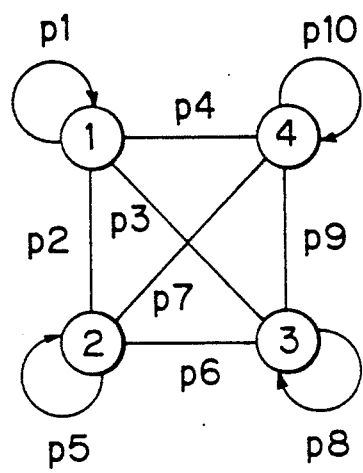
FIG. 9A shows assignment of prime numbers as still another embodiment of the present invention.
FIG. 9B shows assignment of modulus numbers in FIG. 9A.
FIG. 9C shows a table for assigning prime numbers for paths as another example of the embodiment in FIGS. 9A and 9B.
FIG. 9D shows another example of assignment of modulus numbers as shown in FIGS. 9A and 9B.
Figure 9:
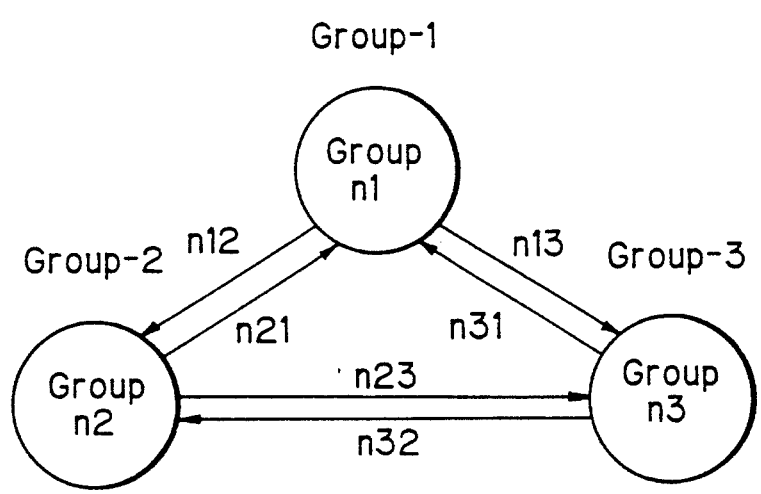
Figure 10:
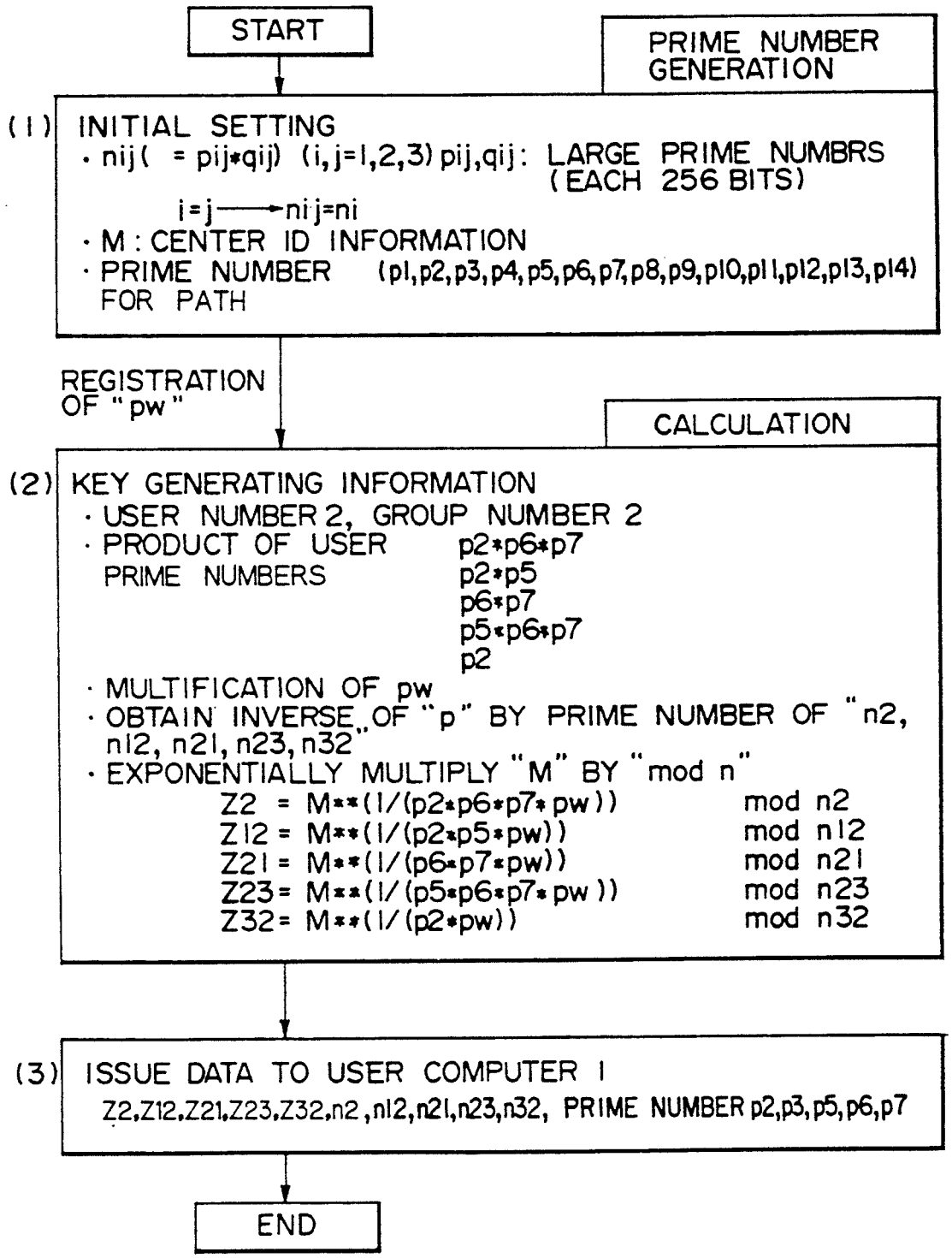
FIG. 10 is a control flowchart in the communication center shown in FIGS. 9A and 9B.
Figure 11:
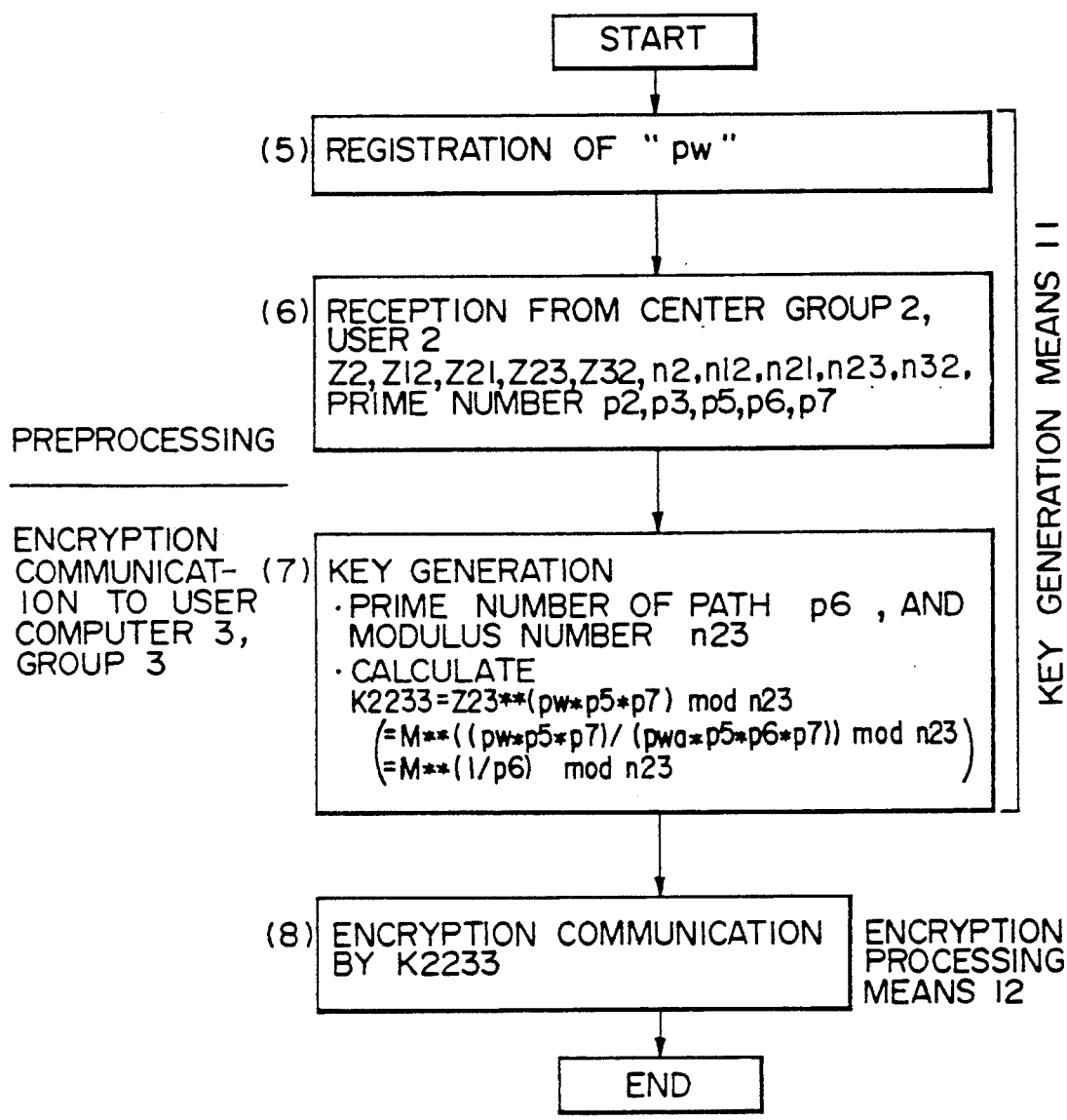
FIG. 11 is a control flowchart in a user computer shown in FIG. 10.

FIGS. 9 to 11 show still another embodiment of the present invention. In this case, the number of the user computers Nu is "12", and the number of the groups Ng is "3". In this case, one modulus number "n" is provided in one group, and two modulus numbers are provided between groups.

FIG. 9A shows assignment of prime numbers as still another embodiment. (i.e., Nu=4) in the group, where numerals 1 to 4 denote user computers in the group, and p1 to p10 denote the prime numbers assigned to the paths in the group. The same prime numbers as another group are assigned for the corresponding user computers in each group. For example, in three groups 1, 2 and 3, the user computer having the identification number 2 assigns prime numbers p2, p5, p6 and p7 as shown in FIG. 9A.

When performing the encryption communication between user computers in the same group, each user computer generates the encryption key by using the modulus number and the key generating information assigned to the group.

When performing the encryption communication between the groups, the user computer generates the encryption key by using the modulus numbers "n1" to "n3" and "n12" to "n31" in FIG. 9B and the key generating information corresponding to the above modulus numbers.

FIG. 9B shows assignment of the modulus numbers. That is, the modulus number "n1" is assigned in the group 1, the modulus number "n2" is assigned in the group 2, and the modulus number "n3" is assigned in the group 3. Further, "n12" and "n21" "n13" and "n31" and "n23" and "n32" are assigned between groups.

Where, an identification number "IDi" is given to the user computer, and "IDj" is given to the other party's computer. Further, when "Ngu" is the number of the user computers in the group, a letter attached "k" to the prime number "Pk" is expressed as follows.

$$k_{ij}=IDj \text{ (when } IDi = 1) \tag{5}$$

$$k_{ij} = \Sigma (Ngu - k) + IDj \text{ (except for above)} \tag{6}$$
$$\text{(from } k = 1 \text{ to } IDj - 1)$$

Where, $IDi < IDj$, and $k_{ij}=k_{ji}$

The selection of the modulus number when performing the encrypting communication between groups "i" and "j" is performed in accordance with the following conditions.

That is, when performing the encryption communication between the number "IDs" of the group "i" and the number "IDt" of the group "j", the modulus number is "nji" when $(Gi > Gj$ and $\tag{7}$ $IDs < IDt)$ or $(Gi < Gj$ and $IDs > IDt)$.

-continued the modulus number is "nij" except for above.  (8)

FIG. 9C shows a table for assigning prime numbers for paths as another embodiment, and FIG. 9D shows another example of assignment of modulus numbers. In FIGS. 9C and 9D, the number of users "Nu" is "12" and the number of groups "Ng" is "3". The numerals in FIG. 9C denote attached numbers "k" of prime numbers "Pk". The slanted portions employ different modulus numbers from peripheral portions although the prime number is the same. FIG. 9D shows selection of the modulus numbers. For example, the user computer 2 of the group 2 issues the following key generation information.

$$Z2 \text{ in group } 2 = M ** (1/(p2 * p6 * p7)) \bmod n2 \quad (7)$$

$$Z12 \text{ between groups 1 and 2} = M** (1/(p2 * p5)) \bmod n12$$

$$Z21 \text{ between groups 2 and 1} = M ** (1/(p6 * p7)) \bmod n21$$

$$Z23 \text{ between groups 2 and 3} = M ** (1/(p5 * p6 * p7)) \bmod n23$$

$$Z32 \text{ between groups 3 and 2} = M ** (1/(p2)) \bmod n32$$

The user computer having the number 2 in the group 2 receives the key generation information and the prime numbers (p2, p3, p5, p6, p7). The encryption key is generated by erasing the prime numbers except for the inverse number of the prime number assigned between groups. For example, since the prime number for the path is already assigned by "p6" as shown in FIG. 9A, the common encrypting key K2233 between the user computer 2 of the group 2 and the user computer 3 of the group 3 can be obtained by using the key generation information Z23 as follows.

$$K2233 = Z23 ** (p5 * p7) \bmod n23$$
$$(= M ** (1/p6) \bmod n23)$$

FIG. 10 is a control flowchart in the communication center shown in FIGS. 9A and 9B. This is in the case of "grouping" and two modulus numbers as shown in FIGS. 9A and 9B.

(1) The center performs an initial setting. That is, the prime number generating means 101a of the key information generating unit 101 sets the following values.
nij (=pij * pij), where, pij and qij are large prime numbers, (each having 256 bits, and when i=j, nij=nj)
M (center identifying information)
prime numbers for patch (p1 to p14)

Where, the modulus number "nij" is given by product (pij * qij) of the large prime numbers "pij" and "qij" (i,j=1, 2, 3).

(2) In the initial setting state as explained above, the center registers the password "pw" from the user computer A, and generates the key generation information.
product of prime numbers: p2 * p5 * p7 (see, the formula (7))
  p2 * p5
  p6 * p7
  p5 * p6 * p7
  p2
multiplication of "pw"
obtain inverse number by prime factor of "n2", "n12", "n21 ", "n23", and "n32".
exponential multiplication "M2" by "mod n"

$$Z2 = M ** (1/(p2 * p6 * p7 * pw)) \bmod n2$$

$$Z12 = M ** (1/(p2 * p5 * pw)) \bmod n12$$

$$Z21 = M ** (1/(p6 * p7 * pw)) \bmod n21$$

$$Z23 = M ** (1/(p5 * p6 * p7 * pw)) \bmod n23$$

$$Z32 = M ** (1/(p2 * pw)) \bmod n32$$

As explained above, the key information generating unit 101 generates the key generation information Z1, Z12, Z21, Z23, and Z32 in accordance with the password "pw" from the user computer A.

(3) The key information generation unit 101 issues the following information to the user computer A.
Z2, Z12, Z21, Z23, and Z32
n2, n12, n21, n23, and n32
prime numbers (p2, p3, p5, p6, p7)

As explained above, in response to the password "pw" from the user computer A, the information which is required to generate the encryption key, is informed to the user computer A.

FIG. 11 is a control flowchart for the user computer shown in FIG. 10. This is a case of the grouping and two modulus numbers as shown in FIGS. 9A and 9B.

(5) The user computer 2 of the group 2 registers the password "pw" in the center.

(6) After registration of the password "pw" into the center, the user computer 2 receives information (Z2, Z12, Z21, Z23, Z32, n2, n12, n21, n23, n32, prime number p2, p3, p5, p7) from the center.

(7) The user computer 2 generates the encryption key before the communication is started with the other party's computer 3 of the group 3. In this process, it is clarified that the prime number is "p6" and the modulus number is "n23" since the user computer 2 tries to communicate with the user computer 3 as shown in FIGS. 9C and 9D. Next, the user computer 2 calculates the following formula.

$$K2233 = Z23 ** (pw * p5 * p7) \bmod n23$$
$$= M ** (1/p6) \bmod n23$$

Accordingly, the encryption key K2233, which is required when performing the encryption communication between the user computer 2 and 3, is generated in the user computer 2.

(8) The encryption communication between the user computer 2 and 3 is started by using the encryption key K2233.

As explained above, the center employs two modulus numbers between groups to generate the key generating information. In the group, one modulus number is used to generate the key information. When the user receives the key information, the user computer 2 generates the encryption key K2233 by using the Z23 in accordance with the table shown in FIG. 9C. As a result, it is possible to reduce number of the prime numbers to half of the numbers compared with the conventional art. When once the processes (5) to (6) are established the encryption key can be generated by steps (7) and (8) without communication with the center.

Figure 12:
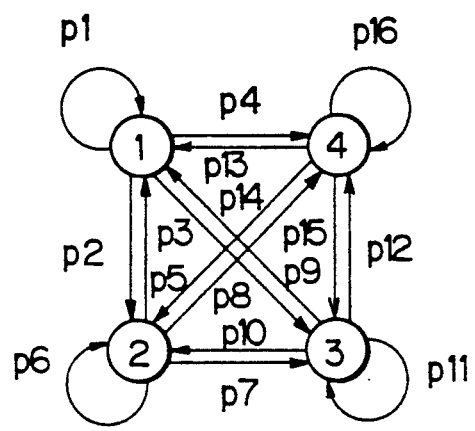
FIG. 12A shows assignment of prime numbers as still another embodiment of the present invention.
FIG. 12B shows assignment of modulus numbers in FIG. 12A.
FIG. 12C shows a table for assigning prime numbers for paths as another example of the embodiment shown in FIGS. 12A and 12B.
FIG. 12D shows another example of assignment of modulus numbers in FIGS. 12A and 12B.
Figure 12:
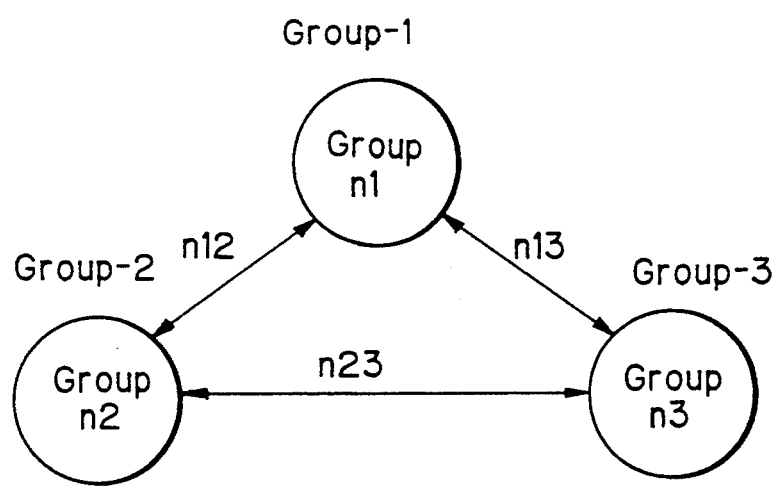
Figure 13:
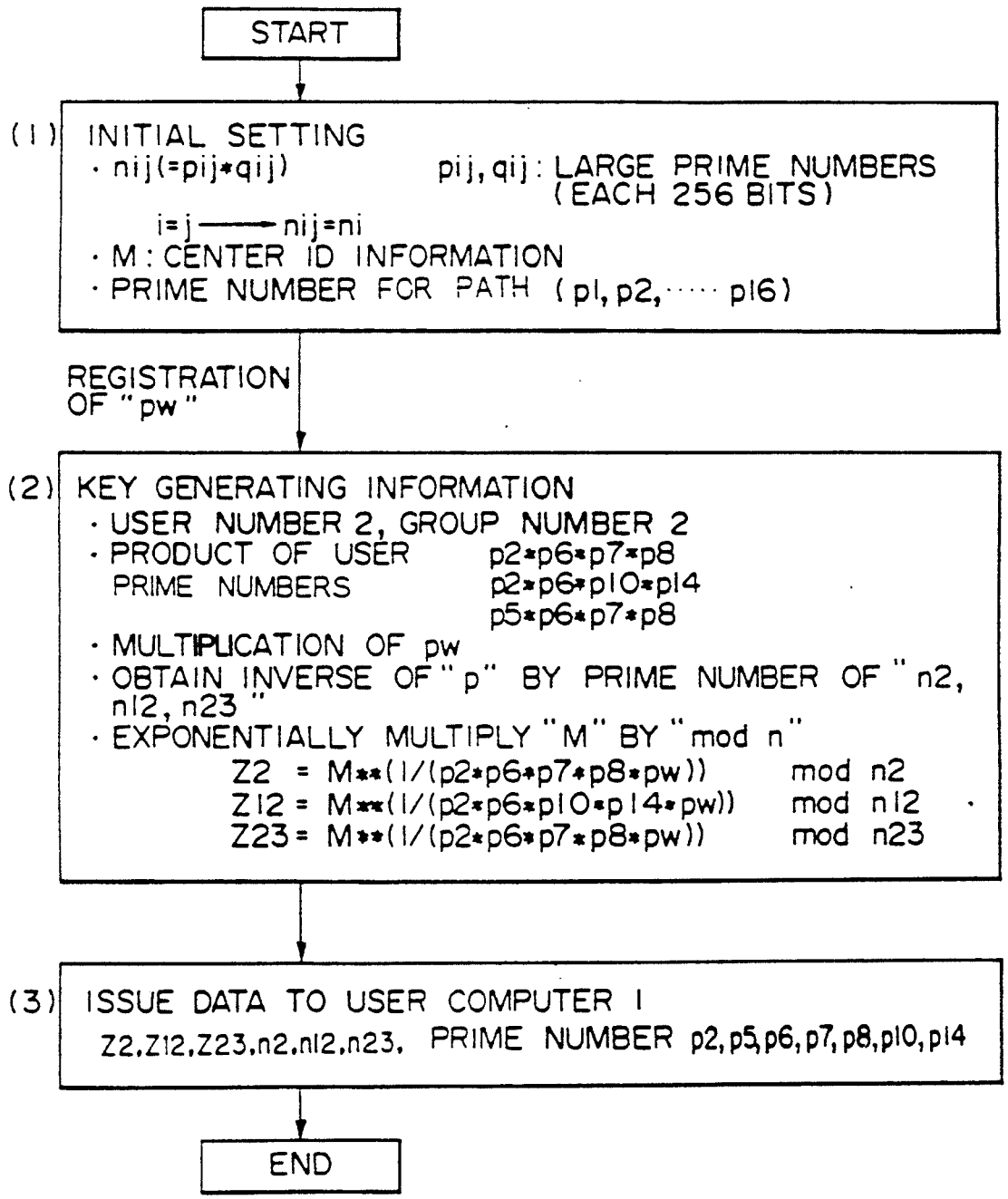
FIG. 13 is a control flowchart of the communication center in FIGS. 12A and 12B.
Figure 14:
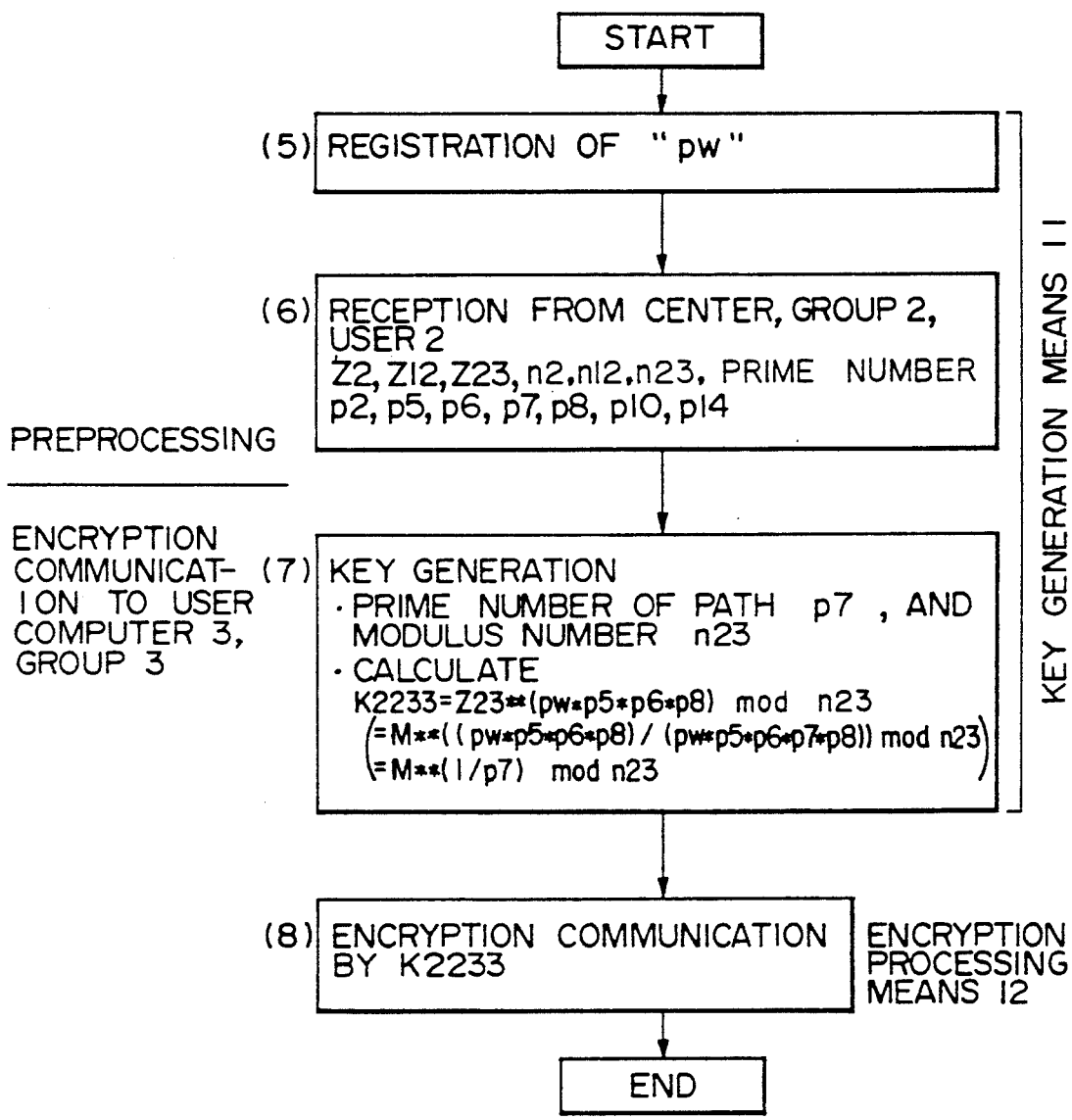
FIG. 14 is a control flowchart for the user computer shown in FIG. 13.

FIGS. 12 to 14 are explanatory views of still another embodiment of the present invention. This is in the case of the number of user computers Nu=12, the number of groups Ng=3, one modulus number "n" in one group, and two prime numbers for the path having direction.

FIG. 12A shows assignment of the prime numbers in the group when the number of user computers in the group Nu is "4". The same prime numbers are assigned for the user computers in each group in accordance with each identification number. For example, the 5 prime numbers p2, p5, p6, p7, p8, p10 and p14 are assigned to the user computer having the identification number "2" in groups 1, 2 and 3.

When performing the encryption communication in the same group, the user computer generates the encryption key by using the modulus number and the key generation information. When performing the encryption communication between the groups, the user computer generates the key by using the modulus numbers shown in FIG. 12B and the key generation information corresponding to the above modulus numbers.

FIG. 12B shows assignment of the modulus numbers. That is, the modulus number "n1" is assigned to the group 1, the modulus number "n2" is assigned to the group 2, and the modulus number "n3" is assigned to the group 3. Further, modulus numbers "n13" "n12" and "n23" are assigned between groups.

An identification number "IDi" is given to the user computer, and "IDj" is given to the partner computer. Further, when "Ngu" is the number of the user computers in the group, the attached letter "k" of the prime number "Pk" is expressed as follows.

$$k = Ngu \, (IDi - 1) + IDj, \quad (9)$$

when IDi is start point.

$$k = Ngu \, (IDj - 1) + IDi, \quad (10)$$

when IDj is start point.

The selection of the ID depends on the group to which the user computer belongs.

In the case of the encryption communication between the IDs of the group "i" and the IDt of the group "j", the prime number is selected as follows.

When $i = j$, the user computer selects the prime number (9)

having the smaller start point between the IDs and IDt.

When $i < j$, the user computer selects the prime number (12)

having the start point of the IDs.

When $i > j$, the user computer selects the prime number having the start point of the IDt.

FIGS. 12C and 12D show the case when the number of user computers "Nu" = 12 and the number of groups Ng = 3. The numerals in FIG. 12C denote attached numbers "k" of prime numbers "Pk". For example, the user computer 2 of the group 2 issues the following key generation information.

$$Z2 \text{ in group } 2 = M ** (1/(p2 * p6 * p7 * p8)) \text{ mod } n2$$

Z12 between groups 1 and 2 =

$$M** (1/(p2 * p6 * p10 * p14)) \text{ mod } n12$$

Z23 between groups 2 and 3 =

$$M ** (1/(p5 * p6 * p7 * p8)) \text{ mod } n23$$

The user computer having the number 2 in the group 2 receives the key generating information and the prime numbers (p2, p5, p6, p7, p8, p10, and p14). The encryption key is generated by erasing the prime number except for the inverse number of the prime number assigned between groups. For example, since the prime number for the patch is assigned by "p7", the common encryption key K2233 between the user computer 2 of the group 2 and the user computer 3 of the group 3 can be obtained by using Z23 as follows.

$$K2233 = Z23 ** (p5 * p6 * p8) \text{ mod } n23$$
$$(= M ** (1/p7) \text{ mod } n23)$$

FIG. 13 is a control flowchart for the communication center. This is in the case of the grouping, one modulus number, and the path having the direction.

(1) The center performs an initial setting. That is, the prime number generating means 101a of the key information generating unit 101 sets the following values.

nij (=pij * qij), where, pij and pij are large prime numbers, (each 256 bits, and when i=j, nij=ni)

M (center identifying information)

prime numbers for path (p1 to p16)

Where, the modulus number "nij" is given by the product of the large prime number "pij * qij" (i, j = 1, 2, 3).

(2) In the initial setting state, when the password "pw" from the user computer A is registered in the center, the center generates the key information.

product of prime numbers: p2 * p7 * p8 p2 * p6 * p10 * p14 p5 * p6 * p7 * p8 multiplication of "pw"

obtain inverse number by prime factor of modulus numbers "n2" "n12" and "n23"

exponential multiplication "M" by "mod n" to obtain Z $$Z2 = M ** (1/(p2 * p7 * p8 * pw)) \text{ mod } n2$$

$$Z12 = M ** (1/(p2 * p6 * p10 * p14 * pw)) \text{ mod } n12$$

$$Z23 = M ** (1/p5 * p6 * p7 * p8 * pw)) \text{ mod } n23$$

As explained above, the key information generating unit 101 generates the key generating information Z1, Z12, and Z23 in accordance with the password "pw" from the user computer 2 of the group 2.

(3) The key information generating unit 11 issues the following information to the user computer A.

Z2, Z12 and Z23 n2, n12 and n23 prime numbers (p2, p5, p6, p7, p8, p10, p14)

As explained above, in response to the password "pw" from the user computer 2, the information, which is required to generate the encryption key in the user computer, is informed from the center to the user computer 2.

FIG. 14 is a control flowchart a user computer. This is in the case of the grouping, one modulus number, and the path having direction, when performing the encryption communication between the user computer 2 of the group 2 and the user computer 3 of the group 3 in FIGS. 12A and 12B.

(5) The user computer 2 of the group 2 registers the password "pw" with the center.

(6) After registration of the password "pw" in the center, the user computer 2 receives the information (Z2, Z12, Z23, n, n12, n23, prime numbers p2, p3, p5, p6, p7, p8, p10, p14) from the center.

(7) The user computer 2 of the group 2 generates the encryption key before the communication is started with the user computer 3 of the group 3. In this process, it is clarified that the prime number is "p7" and the modulus number is "n23" since the user computer 2 tries to communicate with the suer computer 3 as shown in FIGS. 12C and 12D. Next, the user computer 2 calculates the following formula.

$$K2233 = Z23 ** (pw * p5 * p6 * p8) \bmod n23$$
$$= M ** (1/p7) \bmod n23$$

Accordingly, the encryption key K2233, which is required when performing the encryption communication from the user computer 2 of the group 2 to the user computer 3 of the group 3, is generated in the user computer 2.

(8) The encrypting communication between the user computer 2 of the group 2 and the user computer 3 of the group 3 is started by using the encrypting key K2233.

As explained above, the center employs the grouping, the path having direction, and one modulus number, generates the key generation information, and sends them to the user computer 2 of the group 2. The user computer 2 of the group 2 generates the encryption key K2233 by using the key generating information Z23 in accordance with the table shown in FIG. 12C. As a result, it is possible to reduce number of the prime numbers compared with the conventional art. When once the processes (5) to (6) are established, the encryption key can be generated by steps (7) and (8) without comunication with the center.

Figure 15:
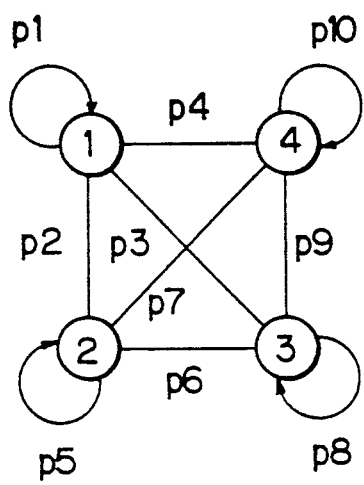
FIG. 15A shows assignment of prime numbers as still another embodiment of the present invention.
FIG. 15B shows assignment of modulus numbers in FIG. 15A.
FIG. 15C shows a tale for assigning prime numbers for paths as another example of the embodiment shown in FIGS. 15A and 15B.
FIG. 15D shows another example of assignment of modulus numbers in FIGS. 15A and 15B.
Figure 15:
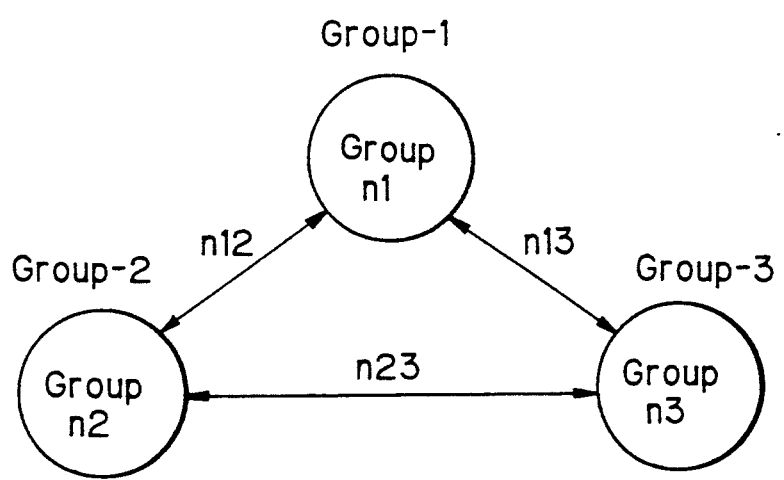
Figure 16:
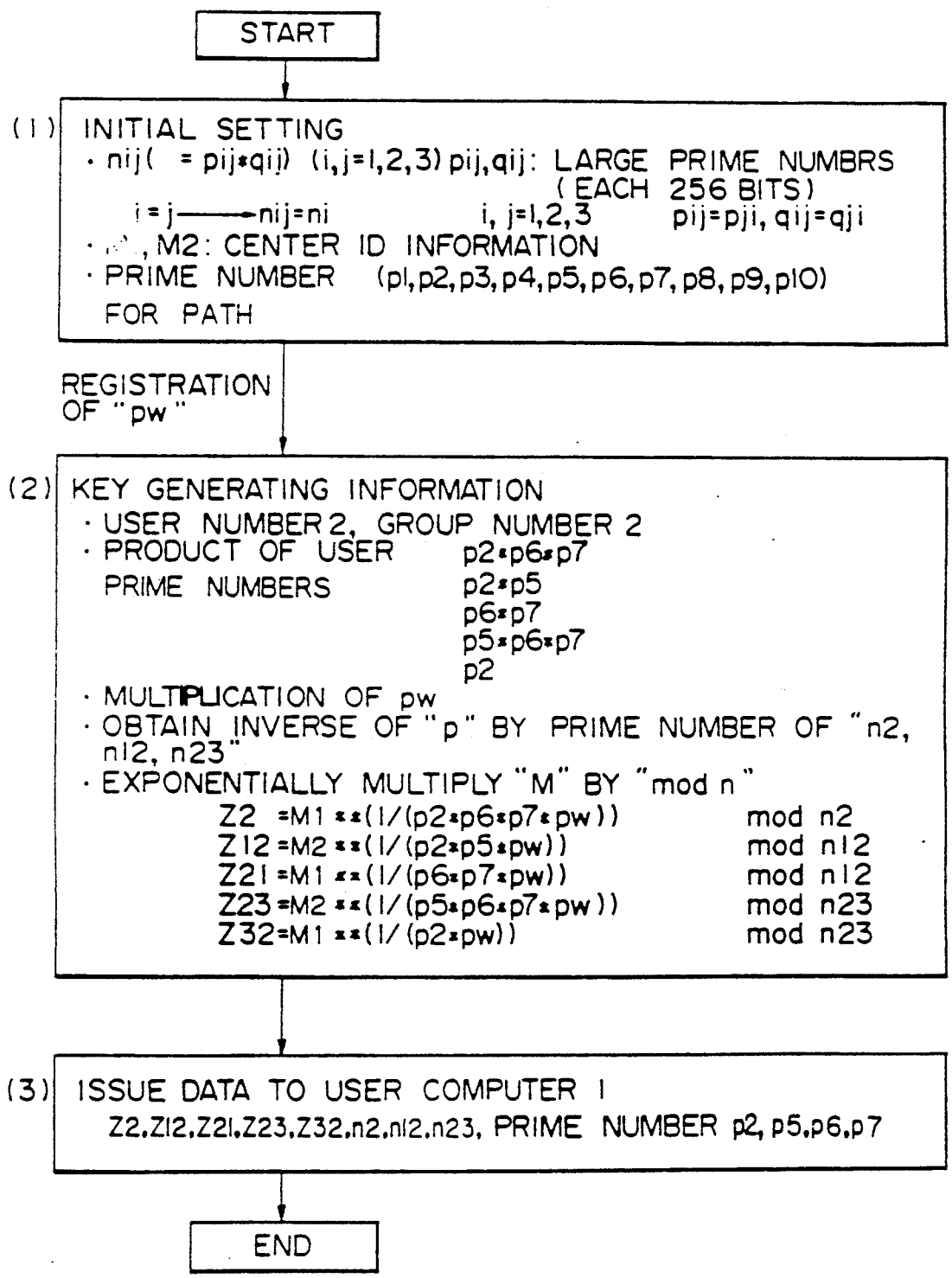
FIG. 16 is a control flowchart of the communication center shown in FIGS. 15A and 15B.
Figure 17:
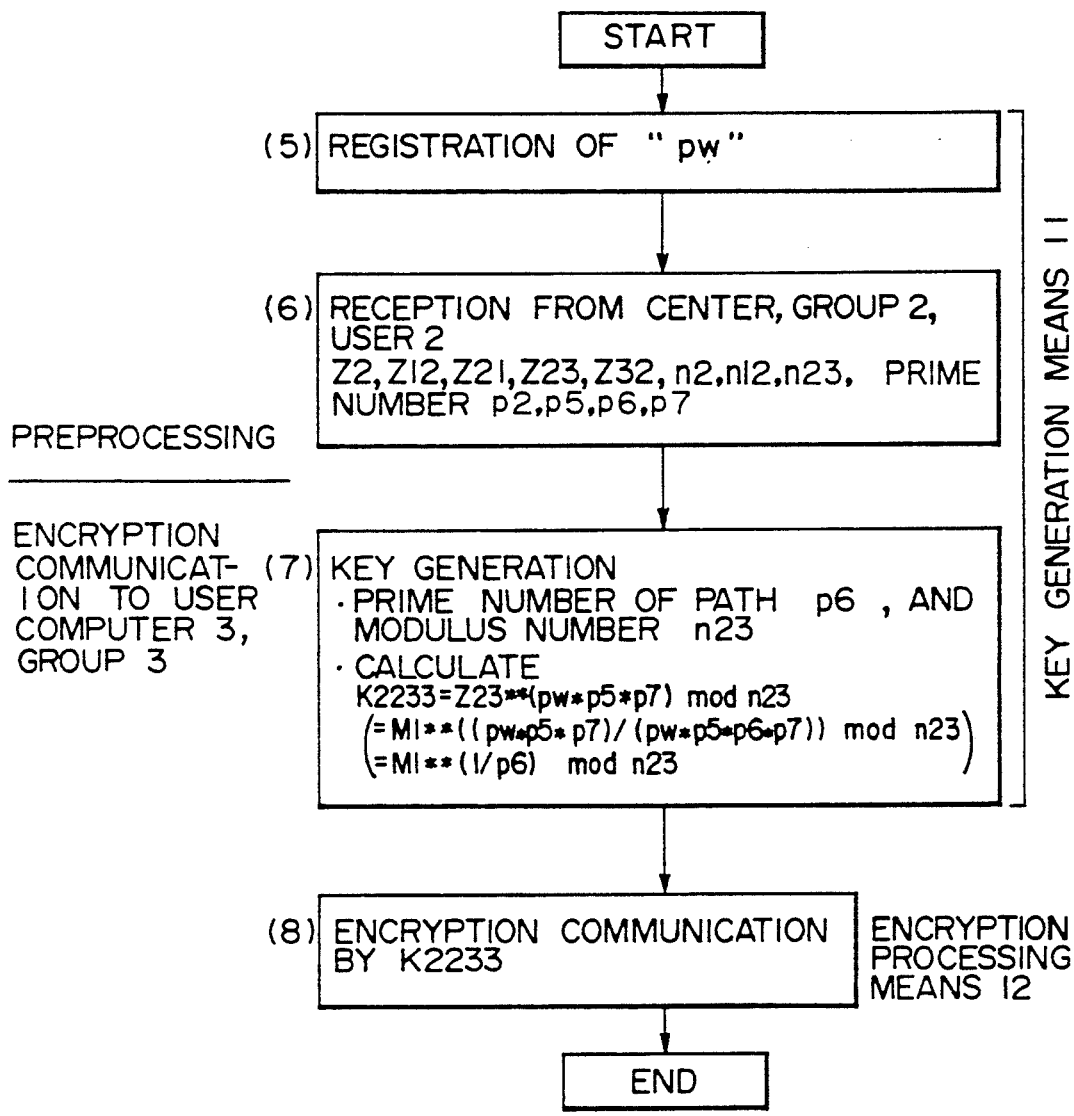
FIG. 17 is a control flowchart for the user computer shown in FIG. 16.

FIGS. 15 to 17 are explanatory views of still another embodiment of the present invention. This is in the case of the number of user computers Nu=12, the number of groups Ng=3, one modulus number "n" in one group, and two pieces of center identifying information.

FIG. 15A shows assignment of the prime numbers (i.e., Ngu=4) in the group. The same prime numbers are assigned for the user computer in each group in accordance with the identification number. That is, the prime numbers p2, p5, p6 and p7 are assigned to the user computer having the identification number "2" in groups 1, 2 and 3.

When performing the encryption communication in the same group, the user computer generates the encryption key by using the modulus numbers and the key generating information in the same group. When performing the encrypting communication between the groups, the the user computer generates the encryption key by using the modulus numbers in FIG. 15B and the key generating information corresponding to the modulus numbers.

FIG. 15B shows assignment of the modulus number. That is, the modulus number "n1" is assigned to the group 1, the modulus number "n2" is assigned to the group 2, and the modulus number "n3" is assigned to the group 3. Further, the modulus numbers "n13" "n12" and "n23" are assigned between groups.

An identification number "IDi" is given to the user computer, and "IDj" is given to the other party's computer. Further, when "Ngu" is the number of user computers in the group, the attached letter "k" of the prime number "Pk" is expressed as follows.

$$k_{ij} = IDj, \text{ when } IDi \text{ is start point.} \quad (14)$$

$$k_{ij} = \Sigma (Ngu - K) + IDj, \text{ except for above} \quad (15)$$
$$(\text{from } k - 1 \text{ to } IDj - 1)$$

where, $IDi < IDj$, $K_{ij} = K_{ji}$.

In the case of the communication between the IDs and the IDt, the center identifying information M1 is used in the case of either Gi>Gj and IDs<IDt, or Gi<Gj and IDs>IDt, and the center identifying information M2 is used except for the above.

FIGS. 15C and 15D are explanatory views in the case of the number of user computers "Nu"=12 and the number of groups Ng=3. The numerals in FIG. 15C denote attached numbers "k" of prime numbers "Pk". Further, the slanted portions are used for the key generating information of "M1" and other portions are used for the key generating information of "M2". For example, the user computer 2 of the group 2 issues the following key generating information.

$$Z2 \text{ in group } 2 = M1 ** (1/(p2 * p6 * p7)) \bmod n2$$

$$Z12 \text{ between groups 1 and 2} = M2 ** (1/(p2 * p5)) \bmod n12$$

$$Z21 \text{ between groups 2 and 1} = M1 ** (1/(p6 * p7)) \bmod n12$$

$$Z23 \text{ between groups 2 and 3} = M2 ** (1/(p5 * p6 * p7)) \bmod n23$$

$$Z32 \text{ between groups 3 and 2} = M3 ** (1/p2) \bmod n23$$

The user computer having the number 2 in the group 2 receives the key generation information and the prime numbers (p2, p5, p6, p7, p8, p10 and p14). The encryption key is generated by erasing the prime number except for the inverse numbers of the prime numbers assigned between groups. For example, since the prime number of the path is assigned by "p6", the common encryption key K2233 between the user computer 2 of the group 2 and the user computer 3 of the group 3 can be obtained by using Z23 as follows.

$$K2233 = Z23 ** (p5 * p7) \bmod n23$$
$$(= M1 ** (1/p6))$$

FIG. 16 is a control flowchart in the communication center. This is a case of the grouping, one modulus number, and two pieces of center identifying information, when performing the encrypting communication between the user computer 2 of the group 2 and the user computer 3 of the group 3 in FIGS. 15A and 15B.

(1) The center performs an initial setting. That is, the prime number generating means 101a of the key information generating unit 101 sets the following values.

nij (=pij * pij), where, pij and qij are large prime numbers, (each 256 bits, and when i=j, nij=ni)

M1 and M2 (center identifying information)

prime numbers for path (p1 to p10)

Where, the modulus number "nij" is given by the product of the large prime number "pij * qij" (i, j=1, 2, 3).

(2) In the initial setting state as explained above, the password "pw" from the user computer A is registered in the center, and the key generation information is generated as follows.

product of prime numbers: p2 * p6 * p7 p2 * p5
p6 * p7
p5 * p6 * p7
p2 multiplication of "pw"
obtain inverse number by prime factors of modulus numbers "n2" "n12" and "n23"
exponential multiplication "M" by "mod n" to obtain Z $$Z2 = M1 ** (1/(p2 * p6 * p7 * pw)) \bmod n2$$

$$Z12 = M2 ** (1/(p2 * p5 * pw)) \bmod n12$$

$$Z21 = M1 ** (1/(p6 * p7 * pw)) \bmod n12$$

$$Z23 = M2 ** (1/(p5 * p6 * p7 * pw)) \bmod n23$$

$$Z32 = M1 ** (1/(p2 * pw)) \bmod n23$$

As explained above, the key information generating unit 101 generates the key generating information Z1, Z12, Z21, Z23 and Z32 in accordance with the information of the password "pw" from the user computer 2 of the group 2.

(3) The key information generating unit 101 issues the following information to the user computer A.
Z2 Z12 Z21 Z23 and Z32
n, n12 and n23
prime numbers (p2, p5, p6, p7)

As explained above, in response to the password "pw" from the user computer 2, the information, which is required to generate the encryption key, is informed to the user computer 2.

(4) FIG. 17 is a control flowchart for the user computer. This is a case of the grouping, one modulus number, and two pieces of center identifying information, when performing the encryption communication between the user computer 2 of the group 2 and the user computer 3 of the group 3 in FIGS. 15A and 15B.

(5) The user computer 2 of the group 2 registers the password "pw" in the center.

(6) After registration of the password "pw", the user computer 2 of the group 2 receives the information (Z2, Z12, Z21, Z23, Z32, n2, n12, n23, prime number (p2, p5, p6, p7) from the center.

(7) The user computer 2 generates the encryption key before the communication is started with the other party's computer 3 of the group 3. In this process, it is clarified that the prime number is "p6" and the modulus is "n23" since the user computer 2 tries to communicate with the user computer 3 as shown in FIGS. 15C and 15D. Next, the user computer 2 calculates the following formula.

$$K2233 = Z23 ** (pw * p5 * p7) \bmod n23$$
$$= M ** (1/p6) \bmod n23$$

Accordingly, the encryption key K2233, which is required when performing the encryption communication between the user computer 2 of the group 2 and the user computer 3 of group 3 is generated in the user computer 2.

(8) The encryption communication between the user computer 2 and 3 is started by using the encrypting key K2233.

As explained above, the center employs the grouping, two center identifying information and one modulus number, generates the key generation information, and sends it to the user computer 2. The user computer 2 generates the encryption key K2233 by using the key generating information Z23 in accordance with the table shown in FIG. 15C. As a result, it is possible to reduce the number of the prime numbers. When once these processes (5) to (6) are established, the encryption key can be generated by steps (7) and (8) without communication with the center.

In FIGS. 9C, 12C, and 15C, "A" corresponds to "10", "B" to "11" "C" to "12", "D" to "13", "E" to "14" "F" to "15" and "G" to "16".

Figure 18D:
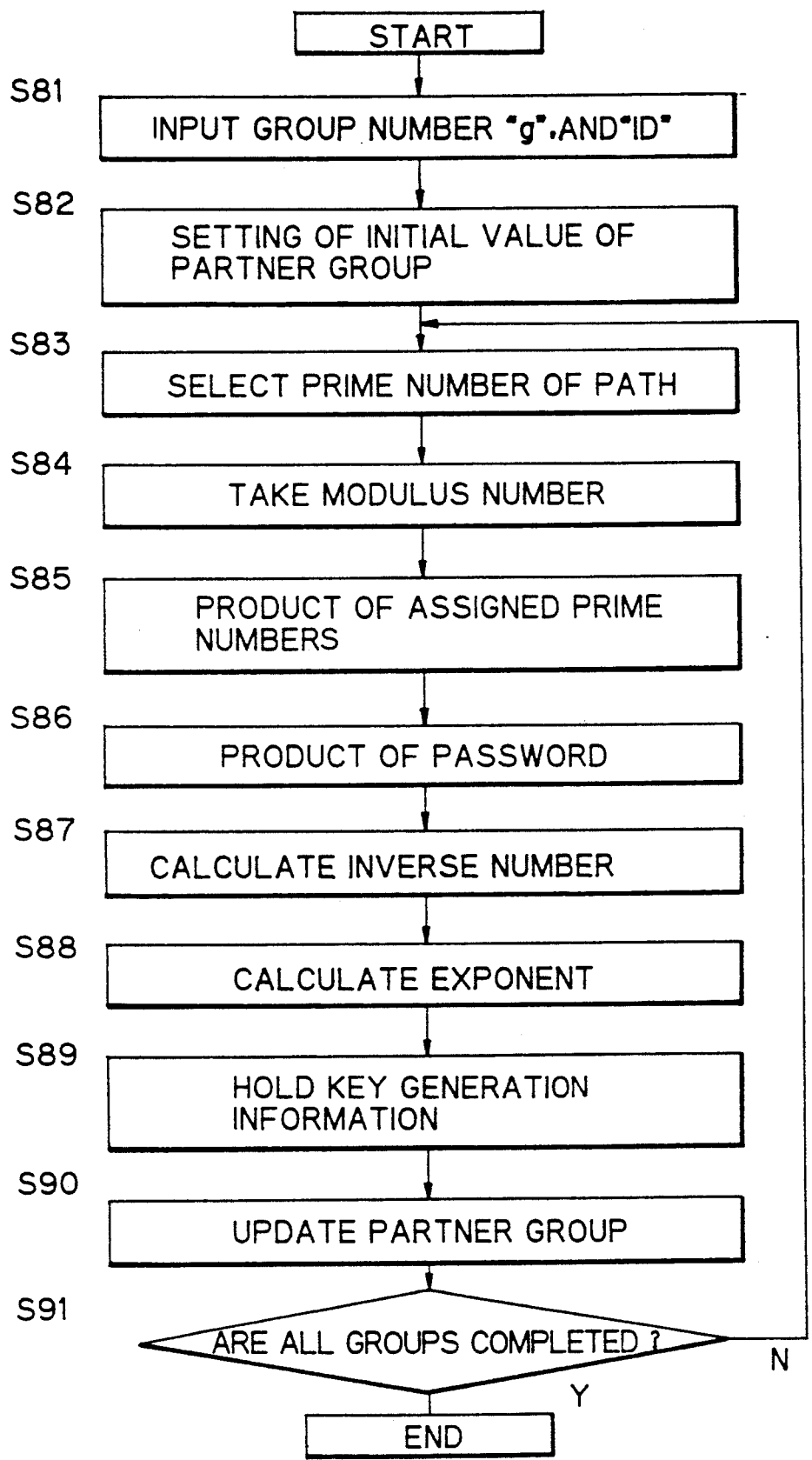

FIGS. 18A to 18D show operation of the key information generating means 101, particularly, the prime number generating means 101a and the calculation means 101b in FIG. 3. FIG. 18A shows a flowchart of key generation information, FIG. 18B shows a flowchart of generation of prime numbers, FIG. 18C shows flowchart of generation of modulus numbers, and FIG. 18D shows a sub-flowchart of a key generation information. In these flowcharts, FIG. 18A is a main flowchart, FIG. 18B is a detailed flowchart of step S3 in FIG. 18A, FIG. 18C is a detailed flowchart of step S4 in FIG. 18A, and FIG. 18D is a detailed flowchart of step S8 in FIG. 18A.

In FIG. 18A, in step S1, the input/output means 101c receives the number of users Nu and the number of the groups Ng. In step S2, the prime number generating means 101a receives the number of the modulus numbers Nn.

In step S3, the prime number generating means 101a generates prime numbers in accordance with steps in FIG. 18B. That is, in step S31, the prime numbers each having 256 bits are generated. In step S32, the generated prime numbers are checked as to whether or not they are suitable for a predetermined conditions, for example, conditions for an RSA encryption system. When the result is "YES", in step S33, the prime numbers are written into the secret file 101d. Further, in step S34, two modulus numbers "Nn" are generated.

In steps S4 and S5, the calculation means 101b generates the modulus number and the prime numbers for the paths in accordance with the steps in FIG. 18C. In step S41, two suitable prime numbers each having 256 bits "pi" and "qi" are taken from the secret file 101d. In step S42, these prime numbers "pi" and "qi" are multiplied. In step S43, the result is written into the public file 12, and further, is stored in the file 101c as the prime number for the path. In step S44, the necessary prime number is generated.

In step S6, the password PW of the user computer is input to the input/output means 101e. In step S7, the group number and user identifying number are assigned, and further, in step S8, the key information is generated as explained in detail in FIG. 18D.

In FIG. 18D, in step S81, the input/output unit 101e receives group number "g" and the user's identification and password. In step S82, the prime number generation unit 101a sets an initial value for the other party's group. In step S83, the prime number generation unit 101a selects the prime number for the path. In step S84, the calculation unit 101b takes the modulus numbers, calculates the product of assigned prime numbers in step S85, calculates the product of the password in step S86, calculates an inverse number in step S87, calculates an exponential number in step S88, and holds the key generation information. Further, the other party's group is updated in a step S90, and the judgement is performed as to whether or not all groups are completed.

In FIG. 18A, the key generating information is issued in step S9, and the judgement is performed as to whether or not operation for all user computers are completed.

We claim:

1. An encryption communication system comprising:
   a communication center having at least a key information generating means for generating key generating information used for encryption communication, and
   a plurality of computers 1 to N including first, second and third computers, each interconnected by a plurality of paths through the communication center, and each having at least an encryption key generating means and an encryption processing means,
   wherein the first computer sends a password PW to the communication center and the communication center generates key generating information based on the following modulo arithmetic formula, $$Z = M^{**}(1/PW^{*}(\text{product of prime numbers})) \bmod n$$

the first computer receives the key generating information from the communication center, and generates an encryption key used between the first computer and the second computer based on the following modulo arithmetic formula, $$K = Z^{**}(PW^{*}(\text{product of prime numbers except for the prime number for the third computer})) \bmod n$$

and wherein, the communication center provides in a public file a plurality of modulus numbers to utilize prime numbers assigned to at least two paths between the first computer and the third computer, and between the first computer and the second computer, so that it is possible to reduce the number of prime numbers,
   where M is center identifying information for the communication center,
   PW is a password generated by the first computer,
   * is multiplication,
   ** is exponential calculation, and
   mod n is modulo n arithmetic.

2. An encryption communication system as claimed in claim 1, wherein the communication center provides a plurality of center identifying information to utilize the prime numbers assigned to at least two paths between the first computer and the third computer, and between the first computer and second computer, to reduce the number of prime numbers.

3. An encryption communication system as claimed in claim 2, wherein said plurality of center identifying information is given by M1 and M2, where M1 is one piece of center identifying information, and M2 is another piece of center identifying information.

4. An encryption communication system as claimed in claim 1 wherein, the communication center provides a plurality of modulus numbers and a plurality of center identifying information to utilize the prime numbers assigned to at least two paths between the first computer and the third computer, and between the first computer and second computer, to reduce the number of prime numbers.

5. An encryption communication system as claimed in claim 4, wherein said plurality of modulus numbers is given by modulus number mod na and modulus number mod nb, where a and b denote two different paths between computers.

6. An encryption communication system as claimed in claim 4, wherein said plurality of center identifying information is given by M1 and M2, where M1 is one piece of center identifying information, and M2 is another piece of center identifying information.

7. An encryption communication system as claimed in claim 1, wherein the communication center divides the plurality of computers into a plurality of groups, assigns the same prime numbers for the paths to the computers in each group, assigns one modulus number for the key generating information within one group, and assigns two modulus numbers for the key generating information between groups to reduce the number of prime numbers.

8. An encryption communication system as claimed in claim 1, wherein the communication center divides the plurality of computers into a plurality groups, assigns the same prime numbers for the paths to the computers in each group, assigns one piece of center identifying information for the key generating information within one group, and assigns two pieces center identifying information for the key generating information between groups to reduce the number of prime numbers.

9. An encryption communication system as claim in claim 1, wherein the communication center divides the plurality of computers into a plurality of groups, assigns the same two prime numbers for the paths having a direction to the computers in each group, and assigns one modulus number for the key generating information within one group and between groups to reduce the number of prime numbers.

10. An encryption communication system as claimed in claim 1, wherein the communication center divides the plurality of computers into a plurality of groups, assigns the same two prime numbers for the paths having the direction to the computers in each group, and assigns one piece of center identifying information of the key generating information with one group and between groups to reduce the number of prime numbers.

11. An encryption communication system as claimed in claim 1, wherein the communication center divides the plurality of computers into a plurality of groups, assigns the same prime numbers for the paths to the computers in each group, assigns one modulus number for the key generating information within one group and between groups, and assigns a plurality of center identifying information for the key generating information within one group and between groups to reduce the number of prime numbers.

12. An encryption communication system as claimed in claim 1, wherein said plurality of modulus numbers is given by modulus number mod na and modulus number mod nb, where a and b denote two different paths between computers.

13. An encryption communication system as claimed in claim 1, wherein said key information generating means comprises a prime number generation unit for generating prime numbers based on the number of the modulus numbers, a calculation unit for calculating two module arithmetic formulae for the key generating information and the encryption key, and a secret file for storing generated prime numbers.

14. An encryption communication system as claimed in claim 1, further comprising a public file for storing the modulus numbers and the prime numbers of the paths, and a control unit for controlling transmission of the key generating information to the computer and reception of the password therefrom.

15. An encryption communication system as claimed in claim 1, wherein said n of the modulus number is determined by calculation of product of two large prime numbers.

16. An encryption communication system as claimed in claim 1, wherein said n of the modulus number is determined by calculation of product of two large prime numbers, each prime number being 256 bits in length.

* * * * *

UNITED STATES PATENT AND TRADEMARK OFFICE
CERTIFICATE OF CORRECTION

PATENT NO. : 5,325,433
DATED : June 28, 1994
INVENTOR(S) : Naoya TORII et al.

It is certified that error appears in the above-indentified patent and that said Letters Patent is hereby corrected as shown below:

Column 9, Line 27, change "ns" to --na--.
Line 49, change "ns" to --na--.
Line 54, change "ns" to --na--.

Column 15, Line 42, change "(9)" to --(11)--.

Signed and Sealed this

Sixth Day of September, 1994

Attest:

BRUCE LEHMAN

*Attesting Officer*      *Commissioner of Patents and Trademarks*